(12) United States Patent
Hamilton et al.

(10) Patent No.: US 7,860,682 B2
(45) Date of Patent: Dec. 28, 2010

(54) INTELLIGENT INTEGRATED DIAGNOSTICS

(75) Inventors: Kelvin Hamilton, Edinburgh (GB); Keith Brown, Edinburgh (GB); Nick Taylor, Edinburgh (GB); David Lane, Edinburgh (GB)

(73) Assignees: SeeByte, Ltd., Edinburgh (GB); Heriot-Watt University, Edinburgh (GB)

( * ) Notice: Subject to any disclaimer, the term of this patent is extended or adjusted under 35 U.S.C. 154(b) by 810 days.

(21) Appl. No.: 10/577,676

(22) PCT Filed: Oct. 29, 2004

(86) PCT No.: PCT/GB2004/004585

§ 371 (c)(1),
(2), (4) Date: Mar. 14, 2007

(87) PCT Pub. No.: WO2005/045693

PCT Pub. Date: May 19, 2005

(65) Prior Publication Data

US 2008/0059839 A1 Mar. 6, 2008

(30) Foreign Application Priority Data

Oct. 31, 2003 (GB) ................................ 0325560.1

(51) Int. Cl.
*G06F 17/00* (2006.01)
(52) U.S. Cl. ........................ 702/183; 702/185; 702/181; 702/196; 709/201; 709/217; 709/218; 709/203; 709/224; 714/26; 714/57; 706/45; 706/47; 706/912

(58) Field of Classification Search ................. 702/183, 702/184, 185, 181, 196; 709/201, 217, 203, 709/218, 224; 714/26, E11.157, E11.145, 714/57; 706/45, 47, 52, 912, 914, 920
See application file for complete search history.

(56) References Cited

U.S. PATENT DOCUMENTS 4,654,852 A * 3/1987 Bentley et al. ................ 714/46

(Continued)

FOREIGN PATENT DOCUMENTS

EP        0 871 126 A2    10/1998

(Continued)

OTHER PUBLICATIONS

International Search Report for corresponding PCT/GB2004/004585 completed Sep. 13, 2005 by K. Kelperis of the EPO.

(Continued)

*Primary Examiner*—Carol S Tsai

(57) ABSTRACT

A diagnostics system comprising a topological map of a target system that has nodes (38, 40, 42, 44, 46, 48) that correspond to components (29, 30, 32, 34, 36) of the target system and links that correspond to connections between the components. Associated with the topological map is a knowledge store (50) that has a structure that reflects or corresponds to that of the topological map. Included in this store (50) is a plurality of sections or libraries each of which is provided for storing design specific data associated with one of the nodes (38, 40, 42, 44, 46, 48) of the topological map. Data received from one or more sensors on the target system is included in the topological map, and used together with the design specific information in the knowledge store to diagnose faults.

15 Claims, 16 Drawing Sheets

U.S. PATENT DOCUMENTS

| | | | |
|---|---|---|---|
| 4,965,743 A * | 10/1990 | Malin et al. | 706/45 |
| 4,985,857 A * | 1/1991 | Bajpai et al. | 702/184 |
| 5,132,920 A | 7/1992 | Bellows et al. | |
| 5,150,367 A | 9/1992 | Tong et al. | |
| 5,528,752 A | 6/1996 | Kise et al. | |
| 5,633,800 A | 5/1997 | Bankert et al. | |
| 5,914,875 A | 6/1999 | Monta et al. | |
| 6,249,755 B1 * | 6/2001 | Yemini et al. | 702/183 |
| 7,197,561 B1 * | 3/2007 | Lovy et al. | 709/224 |
| 7,296,194 B1 * | 11/2007 | Lovy et al. | 714/57 |
| 7,308,322 B1 * | 12/2007 | Discenzo et al. | 700/28 |
| 7,509,540 B1 * | 3/2009 | Lovy et al. | 714/57 |
| 2003/0167111 A1 | 9/2003 | Kipersztok et al. | |
| 2004/0199573 A1 * | 10/2004 | Schwartz et al. | 709/201 |
| 2006/0112061 A1 * | 5/2006 | Masurkar | 706/47 |
| 2009/0216881 A1 * | 8/2009 | Lovy et al. | 709/224 |

FOREIGN PATENT DOCUMENTS

| | | |
|---|---|---|
| EP | 1 136 912 A2 | 9/2001 |

OTHER PUBLICATIONS

Su, et al.: "*Prognostics Framework*", The U.S. Army Test, Measurement, and Diagnostic Equipment Activity, The U.S. Arm Aviation and Missile Command, Redstone Arsenal, AL 35898, 1999 IEEE, p. 661-672.

Garbiras, et al.: "*Fusing Diagnostic Information Without a Priori Performance Knowledge*"; Information Technology Lab, GE Corporated Research & Development, Niskayuna, NY, USA, ISIF 2000, p. TuD5-9-TuD5-16.

Goebel;. et al.; "*Diagnostic Information Fusion: Requirements Flowdown and Interface Issues*"; GE Corporate Research & Development, Niskayuna, NY, 12309, IEEE 2000, p. 155-162.

Freschi: "*Cost and Benefit Considerations for Implementing an Open Systems Approach to Integrated Diagnostics*"; 1999, p. 391-404.

Hamilton, et al.: "*Fault Diagnosis on Autonomous Robotic Vehicles with Recovery: An Integrated Heterogeneous-Knowledge Approach*"; Proceedings of the 2001 IEEE International Conference on Robotics & Automation, Seoul, Korea, May 21-26, 2001, p. 3232-3237.

Hamilton, et al.: "*Enhancing AUV Fault-Diagnosis Capabilities with the Recovery System*"; IEEE Journal of Oceanic Engineering, vol. XX, No. Y, Month 2001, p. 100-115.

Su, et al.: "*Prognostics Framework-Update II*"; 2000 IEEE, p. 497-504.

Freschi: "*Open Systems Approach Integrated Diagnostics Demonstration (OSAIDD) Study—Final Report*"; Jan. 27, 1999, p. 1-68.

\* cited by examiner

INTELLIGENT INTEGRATED DIAGNOSTICS

The present invention relates to an integrated diagnostics system and technique. In particular, the invention relates to a diagnostics system and technique that uses design information about a system, combined with sensor information about the system's current state, and applies multiple methods of diagnosis simultaneously.

Many diagnostic systems are currently available for detecting and diagnosing faults. These systems are particularly important for machines that are used in unfriendly environments, such as down-well or sub-sea equipment of the type used in the oil industry, and where minimising machine downtime is critical. In both these cases, fast and effective methods for diagnosing faults are desirable.

EP 1 136 912 A2 describes a diagnostic engine that uses a model-based technique. Model-based diagnosis involves using a mathematical model of the target system. Different components are represented by the variables of the model. To diagnose a fault the variables are changed until the modelled behaviour of the system matches the observed behaviour. Variables that are different to their normal values are nominated as faulty. In EP 1 136 912 A2, the model-based paradigm incorporates probability theory in the form of Bayes theorem. The model contains information on the coverage of tests on particular components, and probabilistic dependencies between the tests. The diagnosis engine then sets different components as faulty and determines the probability that they are actually at fault. In this way, the most likely source of the fault can be determined.

Another system that uses model based diagnosis is described in EP 0 871 126 A2. In this, when a fault is detected multiple models or hypotheses are generated, with each one containing a different set of faulty components. This is called constraint suppression. Observed machine signals are then propagated through the models/hypotheses using a qualitative physics model. This type of model specifies the mathematical relationship between variables/components in a way that reduces computational intensity. By matching a hypothesis with the observed behaviour, faults can be detected.

U.S. Pat. No. 5,132,920 describes another diagnosis system, which combines model based diagnosis and rule based diagnosis. Rule based diagnosis generally involves storing if-then rules, for instance:'IF this_sensor_reading THEN that_component_is_faulty'. This requires all faults and their related sensor readings to be predicted in advance. Model-based diagnosis involves using a mathematical model of the system, where different components are represented by the variables of the model. A rule base is the simplest and quickest form of diagnosis, whilst model based diagnosis takes a relatively long period of time. In U.S. Pat. No. 5,132,920, the rule base is used to home in on the likely cause of the fault in order to save time before handing over to model based diagnostics.

U.S. Pat. No. 5,150,367 describes a method of enhancing model based diagnosis that uses constraint propagation control. Conventionally, if a fault has been detected at some test point then the signal at that point will differ from the normal signal. The effects of the new signal can be propagated through the model to determine its causes or effects on other signals. In this way, the component producing the faulty signal, i.e. causing the fault, can be determined. U.S. Pat. No. 5,150,367 discloses a mathematical way of coping with multiple propagation, where more than one fault signal has been propagated through the model to a particular component.

U.S. Pat. No. 5,633,800 describes yet another diagnostic system, in this case specifically adapted for rotating machinery. This involves measuring the actual response in the machinery that is to be diagnosed, and determining a probable cause of the mechanical problem based on the actual response. Once this is done, a model of the machinery is selected based on the probable cause, and a predicted response is determined. Then, the model is modified so that the predicted response and the actual response are substantially in agreement. In this way, the mechanical problem can be identified.

Another known approach to diagnostics is to use integrated diagnostic systems. These use a plurality of different diagnostics tools to provide an integrated diagnostic outcome. These systems can improve the diagnostic performance over that of individual diagnostic tools. However, to date there have been only a few attempts at presenting a unified framework for integrated diagnostics, and most concentrate on military weapons programmes. In these systems, in order to fuse differing diagnostic tools a constraint is placed on the tool providers, ensuring that each tool provides a confidence level for each individual fault. Such systems do not generally detail their method of integrating diagnostic tools that operate at different sampling frequencies.

To overcome some of the problems with existing systems, the U.S. Army is developing an integrated diagnostics system, which it refers to as a 'Prognostic Framework'. This is described by L. P. Su, M. Nolan, G. de Mare, and D. Carey in the article "Prognostics framework [for weapon systems health monitoring]", published in AUTOTESTCON Proceedings, IEEE Systems Readiness Technology Conference, 1999, pages 661-672. IEEE, 1999. This is aimed at integrating logistical infrastructure with embedded diagnostics. The foundations of this framework are hierarchical modelling and the separation of test and diagnostic functions. The core of the Prognostic Framework is a design based model, called the fault propagation model that consists of relationships between faults and symptoms. This model is essentially a two dimensional matrix that maps information from raw sensor data, embedded diagnostic tools, pilot debriefing, etc to known faults. A set of intelligent algorithms, collectively known as the diagnostician, then operates on this matrix to isolate faults from given symptoms. The model maps sensor data to physical components. Using this model built-in test information can be extended to diagnosis. A problem with this technique is, however, that to build the matrix all faults and their symptoms have to be foreseen in advance.

Another approach to diagnosis is that used in the relatively new field of diagnostic fusion. This aims to overcome the limitations of using a single diagnostic tool by fusing together the responses from different types of tool. In this way the weaknesses of a rule base may be augmented by the strengths of, say, a neural network to provide a powerful diagnostic system.

Fused diagnostic systems have been around for some time in the form of hybrids. These use diagnostic information fusion to determine a system's state for those instances where several different diagnostic tools, and possible other sources, are used for state estimation. Details of such systems are described in the article "Fusing diagnostic information without a priori performance knowledge" by M. Garbiras and K. Goebel, in the Proceedings of the Third international Conference on Information Fusion, 2000, volume 6, pages 9-16. IEEE, 2000. There are, however, various problems associated with the fusion method proposed by Garbiras et al. For example when information is expressed in different design domains, such as probabilistic information, binary information or weights, the fusion scheme needs to map the different domains into a common one to be able to properly use the encoded data. In addition, the fusion scheme has to deal with diagnostic tools that operate at different sampling frequencies. Furthermore, if diagnostic tools disagree, a decision has to be taken as to which tool to believe and to what degree. Full details of these issues are described in the article "Diagnostic information fusion: requirements flow down and interface issues" by K. Goebel, M. Krok and H. Sutherland, which is published in the Aerospace Conference Proceedings, 2000, volume 6, pages 155-162. IEEE, 2000.

An alternative, more limited approach is proposed by M. Garbiras and K. Goebel in the article "Fusing diagnostic information without a priori performance knowledge", published in the Proceedings of the Third International Conference on Information Fusion, 2000, volume 6, pages 9-16. IEEE, 2000. In this approach, a neural network is used to fuse the outputs of different diagnostic tools, and then focus on providing a system to recognise faults without a priori knowledge of the system. A disadvantage of this approach is that useful design information is ignored.

Despite much work in this field, integrated or fused diagnostic systems are relatively limited. This is confirmed by a study recently conducted by the United States Department of Defence. The results of this study were published by S. Freschi et al, see the article "Open systems integrated diagnostics demonstration (OSAIDD) study", Technical report, Office of the Secretary of Defense, USA, 250 January 1999. One of the key findings of the OSAIDD study was that a consistent approach to integrating diagnostic functions does not exist. The study recommended the use of an information-based, open systems approach to defining and integrating diagnostic functions within the components of a generic architecture of hardware and software elements. This is described in more detail by S. Freschi in the article "Cost and benefit considerations for implementing an open systems approach to integrated diagnostics", published in the proceedings of AUTOTESTCON '99; The IEEE Systems Readiness Technology Conference, pages 391-404. IEEE, Aug. 30 to Sep. 2, 1999.

The architecture proposed by Freschi et al is shown in FIG. 1. The basic premise of the recommended approach is the concept of a formal model of diagnostic information, which is shared by all participants in the system test and diagnosis process. The mechanism for this approach is an information model, which is a rigourous, formal specification of the information used within the system test and diagnostic domain. Optimising this process comes from sharing this information throughout the diagnostic process. The mechanism for the recommended Information Model is shown in FIG. 2. The interface between diagnostic tools is based on the internationally and commonly used Open Systems Interconnection 7 layer network model, as shown in FIG. 3. This proposed interface concentrates on the passing of information via different physical and software technologies and, as such, is a good choice for integrated diagnostics. However, there is no detail on how to actually interface the different types of information produced by different diagnostic paradigms.

The prior art systems described above all suffer from the same problem. They are all individual diagnostic tools, designed only to take in specific forms of sensor data and provide a diagnosis. Although some of them are integrated diagnostic systems or fusion systems, they are designed to fuse only particular systems, they are not designed to be a generic framework for fault detection and diagnosis, nor are they able to fuse a multitude of different types of tools and information. To overcome some of these problems, a system using an integrated heterogeneous knowledge approach has been proposed. This is described by Hamilton et al in "Fault Diagnosis on Autonomous Robotic Vehicles with RECOVERY", Proceedings of the 2001 IEEE International Conference on Robotics & Automation, Seoul, Korea—May 21-26, 2001. The present invention builds on the system described in this article.

Various aspects of the invention are defined in the independent claims. Some preferred features are defined in the dependent claims.

According to one aspect of the present invention there is provided a diagnostics system comprising a topological map of a target system that has nodes that correspond to components of the target system and links that correspond to connections between the components; a knowledge store that has a structure that reflects or corresponds to that of the topological map, the store having a plurality of sections or libraries each of which is provided for storing data associated with one of the nodes defined in the topological map; means for receiving data from one or more sensors on the target system; means for including the received data in the topological map, and means for diagnosing faults using the data in the topological map and the knowledge store.

By using the received sensor data and/or data in the knowledge database, the accuracy of the final diagnosis is improved. By structuring the knowledge database to match the target system's topology the time taken, and therefore the electrical power required, to diagnose a fault can be reduced. This is advantageous.

The invention is intended to use different diagnostic systems, together with design information and live sensor data, to enhance diagnostic capability and provide training, logistical and maintenance advantages. To this end, the topological map of the target system is used to act as common ground between different types of diagnostic tool, design information and sensor data. Doing this provides enhanced diagnosis over that provided by any individual diagnostic system, and allows novel forms of domain independent diagnostics to be used.

Preferably, the system includes one or more domain independent diagnostics tools. For example the system may include a correlator that is operable to nominate components as being faulty on the basis of one or more of the following observations: parameters that track faulty parameters are likely to be related to the fault; faults that occur at similar times are likely to be related to the fault; components that become active (after a period of inactivity) just before the occurrence of a fault are likely to be related to the fault, and components that are being used at the time of a fault are more likely to be related to the fault than inactive components.

As another example of a domain independent tool, the system may also include a domain independent topology analyser that is operable to look for common connections between apparently faulty components. Ideally, the topology analyser has a tolerance. For example, it may be configured to nominate a common connection as being faulty only if more than a pre-determined number of active components connected to the common connection appear faulty.

Various aspects of the invention will now be described by way of example only, and with reference to the accompanying drawings, of which:

Figure 1:
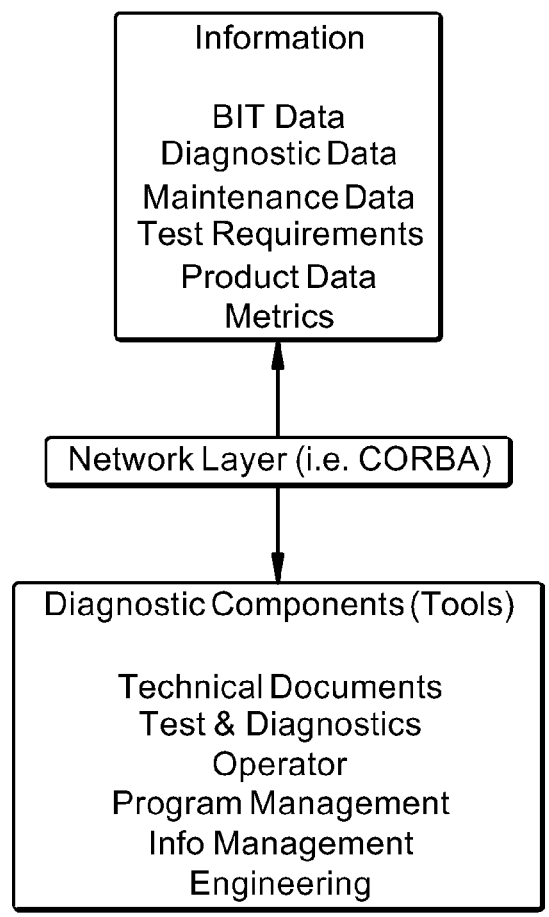
FIG. 1 is a block diagram that represents an example of an integrated diagnostics system.
Figure 2:
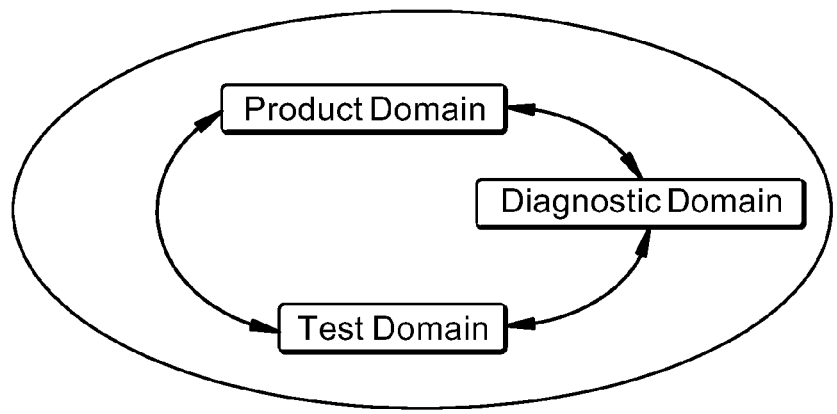
FIG. 2 is a block diagram that represents an example of a mechanism for an information model.
Figure 3:
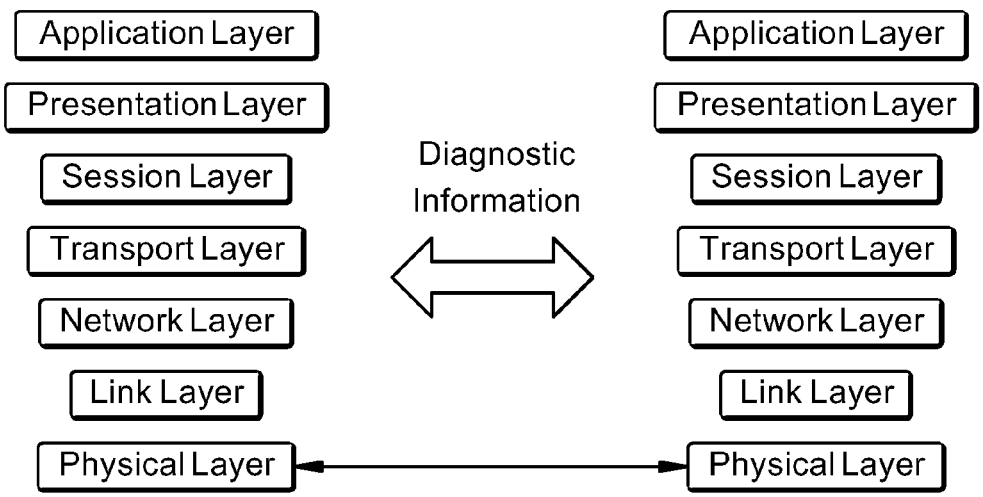
FIG. 3 is a block diagram that represents an example of an interface between diagnostic tools.
Figure 4:
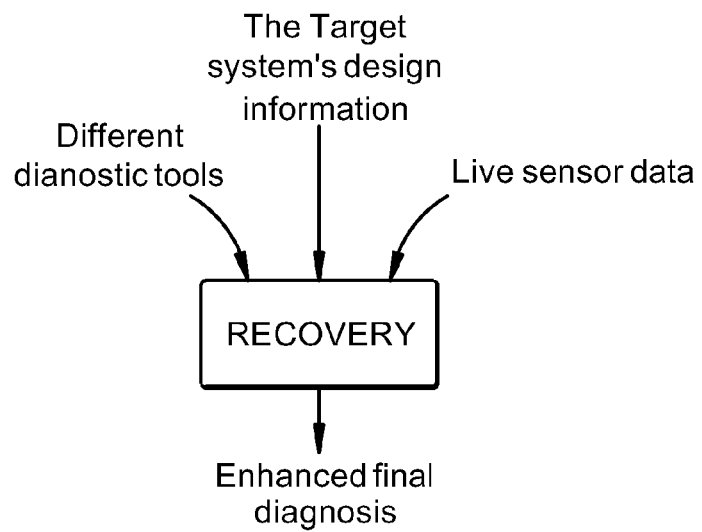
FIG. 4 is a diagrammatic representation of the system concept.

FIG. 4 shows a diagnostic system for use in or in connection with a target system, such as a vehicle. Typically, the system is implemented in software and runs on a computer, although it could be implemented in hardware such as an ASIC or FPGA. The diagnostic system of FIG. 4 is configured to use design information relating to the target system, live sensor data received from sensors on the target system and a plurality of different diagnostic tools to provide an enhanced diagnosis of system faults as and when they arise.

Figure 5:
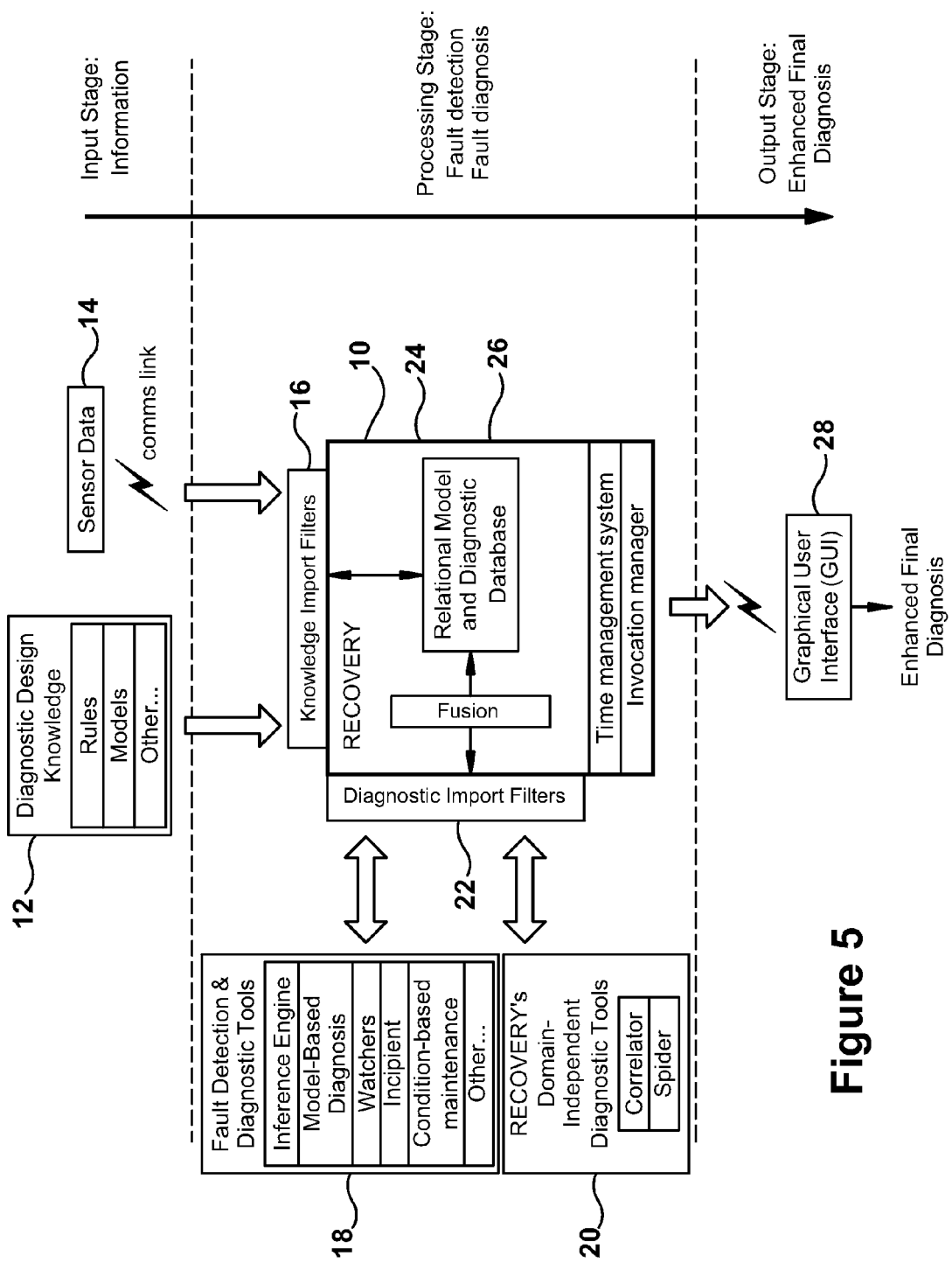
FIG. 5 is a block diagram of a system for implementing the concept of FIG. 4.

The system architecture is shown in more detail in FIG. 5. From this it can be seen that the system includes a main control module 10 that is operable to receive diagnostic design knowledge 12, including details of rules or models that apply to the design. It is also operable to receive live sensor data 14 from sensors located on the target system. Each of the design and live sensor data is input to the control module 10 via a suitable interface 16. The control module 10 is also operable to use inputs from a plurality of diagnostic tools 18, such as an inference engine; a model based diagnosis module; a watcher; an incipient for detecting faults that develop slowly over time before they cause failure and a condition based maintenance module that is able to predict when maintenance may occur and thereby determine whether maintenance is needed. In addition to these, the control module 10 is operable to receive inputs from various domain independent diagnostic tools 20 such as a correlator and a topology analysis module.

These will be described in more detail later. All of the diagnostic tools 18, 20 communicate with the control module via a suitable interface 22.

Within the main control module 10 is a relational model 24 and a diagnostic or knowledge database 26 that includes data relating to the target system. The relational model 24 is the core of the system. Also within the control module 10 is software (not shown) that is operable to use data within the relational model 24 to determine whether any faults are present in the target system. Normal operation of the overall diagnostics system is set up and controlled by the control module 10. The output of this module ultimately consists of a list of suspicious components and a measure of confidence, typically ranked in order of suspicion (highest first). This may be displayed on a suitable graphical user interface 28 or may be transferred or transmitted to any suitable program or system.

One of the most important inputs to the control module 10 is a topological map of the target system, which map is used as the basic structure of the relational model 24. By topological map is meant a map that is representative of the way in which different parts of the system are connected together. For instance, a roadmap of the UK is a topological map of the transport system, with cities interconnected by motorways, railway lines and rivers. The topological map can be generated in any suitable manner, for example by manually developing a map. The target system is modelled by breaking it down into a set of different types of nodes, and different types of links. Each node represents a component that is to be monitored or data associated with particular components. In this context, a component is defined to be a part that can be diagnosed as faulty. Nodes are connected by pre-defined links, in the same way that system components are connected in real life. Of course, this has to be done within practical limitations. For example, whilst circuit connections may have some level of associated resistance or inductance, this is generally ignored, as is inter-connection capacitance. Once the topological map is input, it forms the basic framework of the relational model 24. The relational model 24 includes the topological map and additionally component data. This component data may be received from sensors or may be modelled or calculated by the system software, such as a measure of suspicion that is indicative of whether or not the component is faulty. The data within the relational model 24 is dynamically up-dated by the system software as and when changes are detected in the target system.

Figure 6:
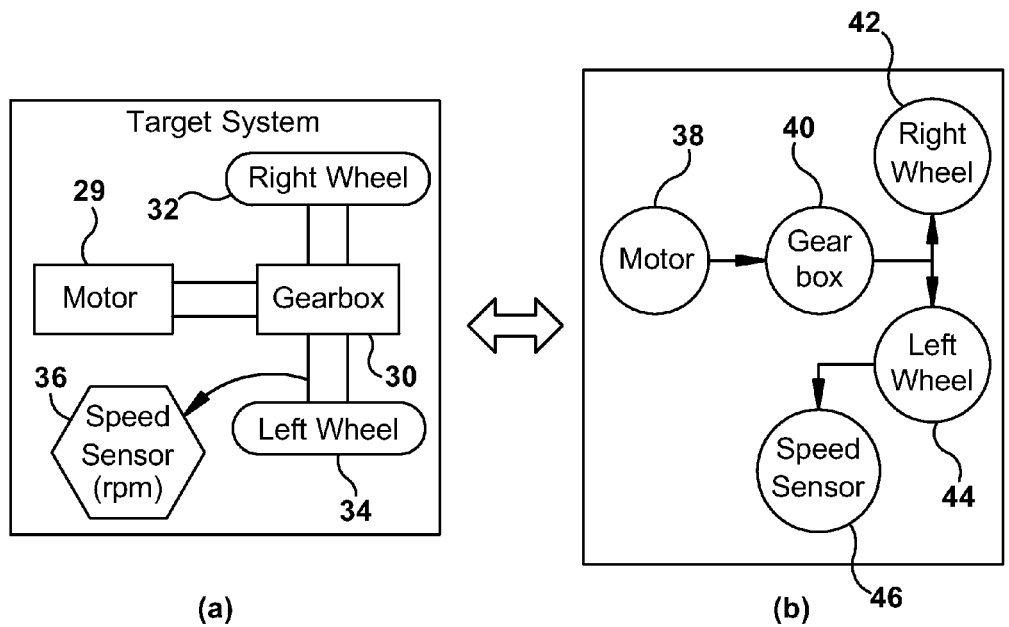
FIG. 6(*a*) is a block diagram of a target system and FIG. 6(*b*) is a topological map of the system of FIG. 6(*a*)

To give an example of a topological map consider a simple car drive system shown in FIG. 6(*a*). In this example, the car consists of a motor 29 driving a gearbox 30, which in turn drives the left and right wheels 32 and 34 respectively. A speed sensor 36 is connected to one of the wheels 34 to measure the revs per minute (rpm). This simple target system is mapped into the relational model 24 by using a motor node 38, a gearbox node 40, a right wheel node 42, a left wheel node 44 and a sensor node 46, as shown in FIG. 6(*b*). Each node represents a component of the target system. The nodes 38, 40, 42 and 44 are linked to show that the motor 29 drives the gearbox 30, which drives the two wheels 32 and 34. Although not shown in this example, the different components are of different types and can be represented using different types of nodes. Likewise, different connections can be represented by different types of links. In addition, nodes can be more than just an abstract representation of a component. As a particular example, data nodes can be included in the relational model 24 and used to store live sensor data.

Figure 7:
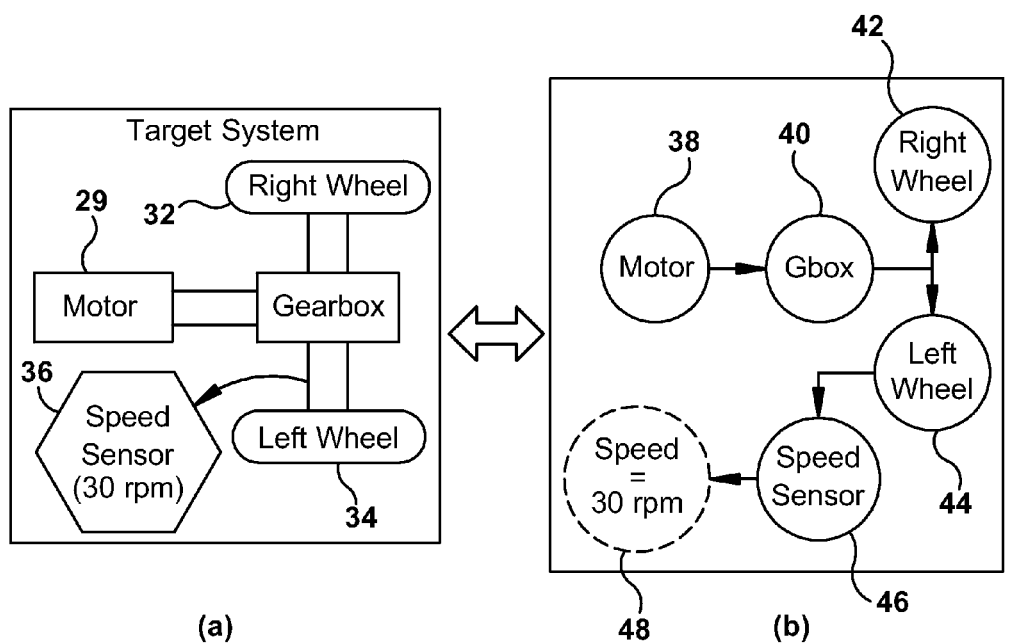
FIG. 7(*a*) is a block diagram that represents the target system of FIG. 6(*a*), when it is running, and FIG. 7(*b*) is a topological map of the system of FIG. 7(*a*)

FIG. 7(*a*) shows a representation of the situation when the car of FIG. 6(*a*) is moving and the speed sensor 36 is measuring the speed of the left wheel as 30 rpm. FIG. 7(b) shows the corresponding topological map for the target system of FIG. 7(a). This is identical to the map of FIG. 6(b), except that in this case a data node 48 is linked to the speed sensor node 46. In this case, data from the speed sensor 36 is received by the relational model, which adds that data to the pre-designated data node 48 to give the map shown in FIG. 7(b). From this it can be seen that the data node has been filled with a value of 30 rpm, which is all that is known about the state of the system at this time. In this way, the relational model dynamically up-dates the map as and when live sensor data is received.

The topological map of the system is used as a framework to create the diagnostic or knowledge database 26. This database is structured to match the topology of the target system. Within this database, each component is associated with information that is specific to it, such as the mean time between failure (MTBF), maximum and minimum operating conditions, known weaknesses, recent problems, and more. By structuring the database to reflect the target system topology in this way, there is provided a simple and yet fast mechanism for allowing access to information, thereby enabling faults to be traced relatively quickly.

Figure 8:
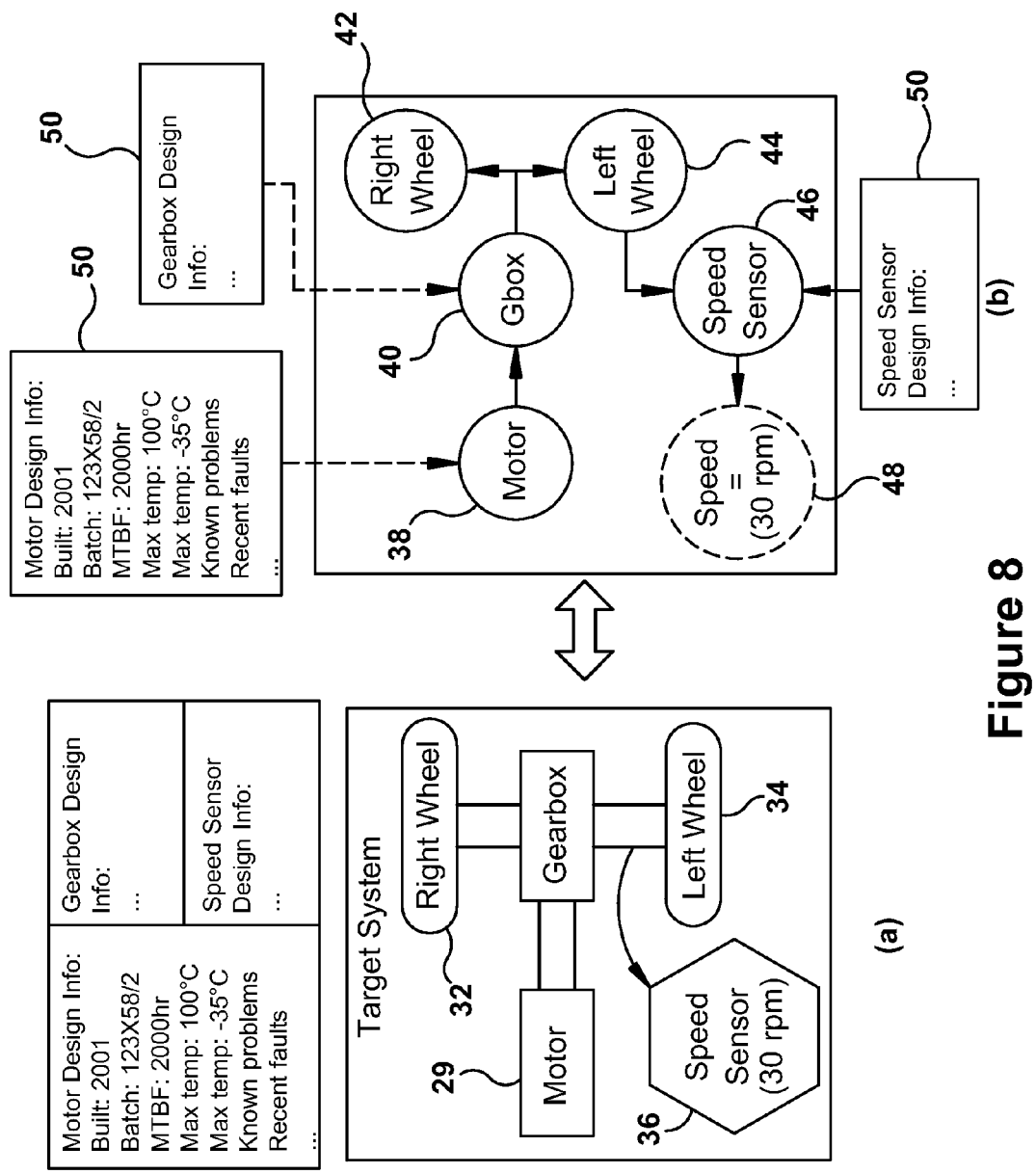
FIG. 8(*a*) is the same as FIG. 7(*a*), but includes design data that is associated with each of the components, and FIG. 8(*b*) is a diagrammatic representation of the link between component design data and the corresponding component nodes.

FIG. 8(a) shows an example of a structure for storing the design information for the target system of FIG. 8(b). In this case, linked to each node in the topological map using, for example, a suitable pointer is design information associated with that node. In particular, linked to the motor node 38 is a block of data 50 that includes details of the year in which it was made; the batch number; the MTBF; maximum and minimum temperatures and a list of known and/or recent faults. Likewise similar data blocks 50 are linked to the gearbox node 40 and the speed sensor node 46. Linking component knowledge to the nodes of the topological map means that the knowledge database has, essentially the same structure as the map.

Figure 9:
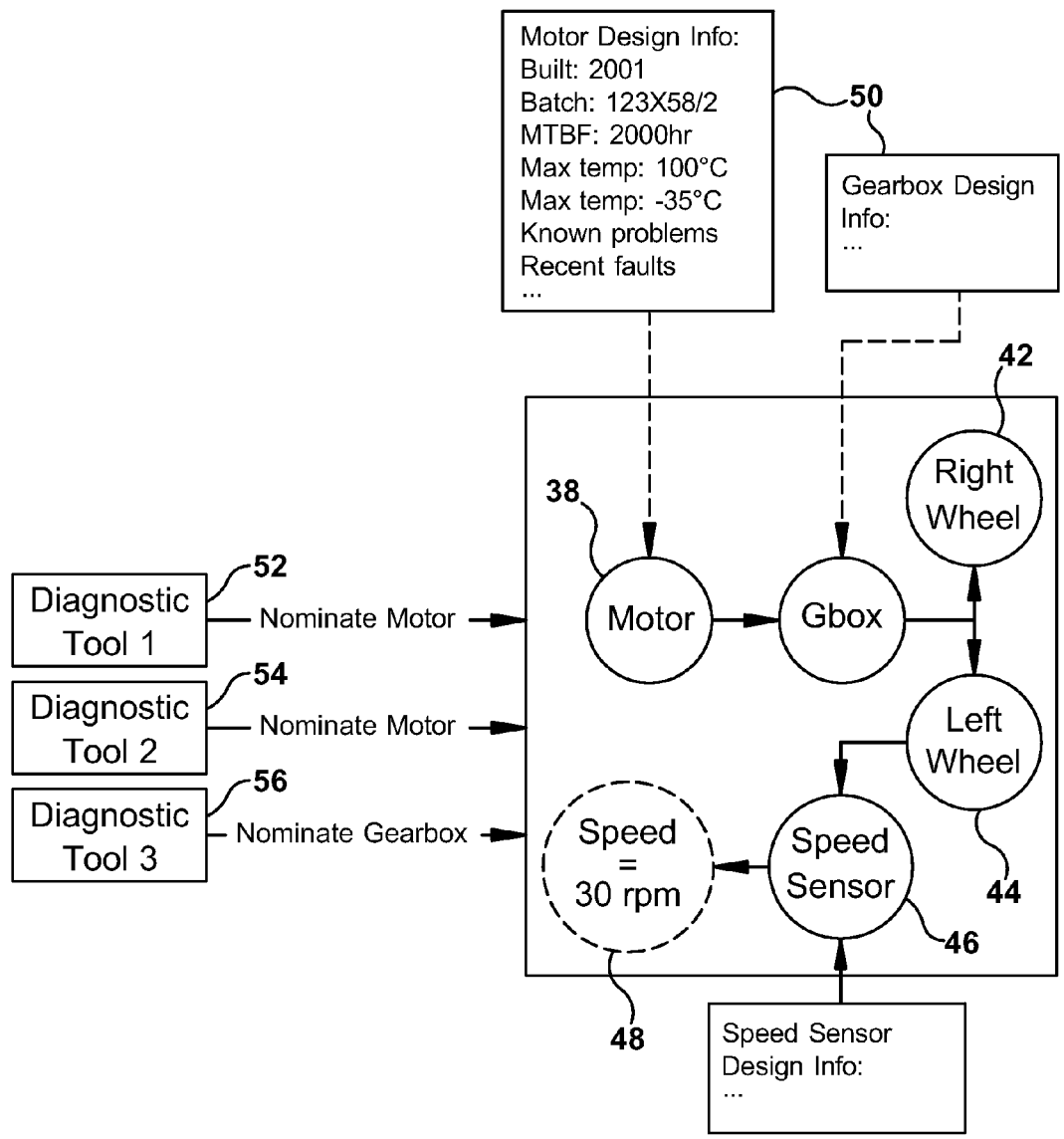
FIG. 9 is a diagrammatic representation of the system of FIGS. 6 to 8, in use, with diagnostic information being provided by several different diagnostic tools.

To diagnose faults, various known diagnostic tools, and some domain independent diagnostic tools are used. Because the relational model has access to and can use the outputs from a plurality of the tools, it provides common ground for all the isolated diagnostic systems. This can be seen in FIG. 9. Here, the system includes three independent diagnostic tools 52, 54 and 56. Each of these isolated diagnostic tools 52, 54 and 56 is able to nominate components within the target system as being faulty, not just in isolation. In this case two of the diagnostic systems overlap, in that they can both nominate the motor. Indeed, in this specific example both of these have nominated the motor. By taking a system-wide view, it can be seen that having multiple, isolated diagnostic tools nominating the same component increases the probability that it is a correct diagnosis. Because the system provides common ground for multiple diagnostic systems their outputs may be 'fused', or combined, thereby providing a better overall diagnosis compared to using any one isolated system. This will be described in more detail later.

Various different diagnostic tools can be used in the system in which the invention is embodied. However, it is preferred that at least some of these are domain independent. Domain-independent diagnostics can provide the ability to diagnose components that are not directly sensed by analysing the effect that they have on other components. The relational model, comprising as it does of components and their inter-relationships, is particularly suited to this task. To take advantage of the system architecture, the relational model includes a correlator. This uses domain-independent diagnostic knowledge. In particular, this module uses the following domain-independent diagnostic information: a measure of parameters that track faulty parameters; a record of which components were used recently, and a status indicator that is indicative of whether a component is currently active.

To track faulty parameters, each parameter has associated with it a delta index that is generated by the correlator. This is stored in the parameter node for the relevant parameter. The delta index is a measure of how the parameter has changed with respect to time. In order to assess whether parameters are tracking a faulty parameter, the delta index of each parameter is compared to the faulty parameter's delta index. Typically, the delta index for each parameter starts at zero. Each time the correlator is invoked, the delta index is incremented by one if the parameter has increased, decremented if the parameter has decreased and not modified if the parameter has not changed. If a parameter has increased at every sample over a particular time period, then the delta index will also have climbed constantly. The delta indices are then compared to the faulty parameter, and any that are close in value are nominated as a 'tracking parameter'. In practice, for a parameter to be nominated as tracking a faulty parameter its delta index typically has to be within a certain amount of the faulty parameter's delta index. This amount is called the delta window. The size of the delta window would usually be determined on a case-by-case basis depending on the target system.

As an example of the benefits of tracking parameters to detect faults, consider a wheeled robot having a speed sensor and a temperature sensor. If this wheeled robot had a maximum set speed and the measured speed exceeded that maximum speed then a snapshot of the system would show only that the robot was travelling too fast. However, if by looking back at the history of the vehicle, it could be seen that the maximum speed of the robot was creeping up at approximately the same rate as the temperature, then this would represent a correlation as described above: "Parameters that track faulty parameters are likely to be related to the fault". A correlation of this kind is useful in diagnosing the actual fault. Whilst this is a rather simplistic example, the concept is valid as the correlator would have noticed the association between temperature and sensor drift without this knowledge being explicitly represented.

As well as identifying parameters that track faulty parameters, the correlator is operable to monitor recently used parameters. To allow for this, the system software is operable to keep a record of which components are active and if and when they become inactive. To check which components are active, each has associated with it an activity status indicator that is up-dated based on incoming sensor data. Monitoring recently used components is useful for the correlator. For instance, if the brakes are applied on a car after being unused for a while, and there is immediately a loud bang followed by a great deal of shuddering, a fair assumption is that there is a brake problem. Two parameters are needed to match this type of information, these being the length of time of inactivity and the length of time before the fault that the component was activated. The correlator is operable to use these to nominate components that are likely to have failed. Likewise, an active component is more likely to contribute to a fault than an inactive one. By active, this means a component that is supposed to be active, including components that are inactive through failure. Hence, by monitoring active components the correlator again is able to focus in on components that are more likely to have failed.

In order to keep track of the information needed by the correlator, the relational model is operable to maintain a temporal log file, which represents the temporal dimension of the system. Incoming sensor information is logged in this file, together with activity status, fault status and every other aspect of system related data. This is done for each iteration of the diagnostic procedure during both normal operation, i.e. when no faults are detected, and fault diagnosis, i.e. when faults are detected. Each time data is entered in the temporal log, it is date stamped and stored, so that the status of all of the components can be monitored as a function of time.

When a fault occurs the correlator is adapted to look back through the temporal log file and search for the correlations described above. If correlations are found between various components and parameters this information may be used to modify the relational model. For example, each component may have a suspicion index associated with it, which is indicative of whether or not it is suspected of being faulty. In the event that the correlator determines that a given component may be at fault, it causes the relational model to increment the relevant component's suspicion index. This modification effectively highlights suspicious components or parameters, which are then used to guide the diagnosis engines towards sections of knowledge thought to be most relevant.

In addition to the correlator, the diagnostic system in which the invention is embodied also includes a topological analysis module. This uses domain-independent knowledge in a similar way to the correlator, but where the correlator is primarily concerned with searching the temporal log file to identify temporal changes in data parameters, the topological analysis module checks relationships between relational model nodes. For example, if several components are diagnosed as faulty and they have a common supply connection then the topology module is configured to nominate the commonly connected component as being faulty. If multiple components are thought to be faulty and there is a common connection then it is likely that the connection is the problem. This is readily apparent with power supplies; if all the active components 'fail' then it is likely to be the power supply that is actually at fault. Power supply connections are numerous and one of the most common forms of component information. For a common source component (i.e. a power supply) to be nominated as faulty then a certain number of its active supplied components must have been nominated as faulty. This is known as the nomination threshold.

The topological analysis module is concerned with components that have been diagnosed as faulty. To increase the performance of this module it is invoked after all other diagnostic tools have been run, or iterated when faulty components have the most chance of having been detected or diagnosed. This module can be implemented in any suitable manner. However, as an example, it may use a fault rating in order to determine which components should be nominated as being faulty. In the case of a commonly connected power supply, this is determined by dividing the number of active components by the number of nominated components, all of which must be supplied by the relevant power supply. If the fault threshold is exceeded the supplied components can be assumed to be functioning and the power supply or other source component could be the cause of the fault. It should be noted that the topology analyser module only looks at components that are active. Non-active components do not generally effect system performance and so are disregarded.

Operation of the system in which the invention is embodied will now be described in more detail. The system is operable to carry out three basic, but distinct stages (1) Input and initialisation: where information is received and extra information is generated; (2) Processing: where the information is processed by various tools to provide fault detection and diagnosis, and (3) Output: where the diagnosis is provided.

In the initialisation mode design information is read into the control module 10, which constructs the relational model that represents the target system. The first requirement is to build the target system topology by filling the relational model with nodes and links of various types. As noted before, there are several different types of nodes and links.

Component nodes include the following: systemic sensor components, i.e. sensors that sense the state of the vehicle; environmental sensor components, i.e. sensors that sense the state of the environment; power supply components, i.e. source components that provide power to other components; generic components of no specific type and supplied with power by a power supply component, and sub-components, i.e. components that are part of other components and are only diagnosable using the component-specific knowledge attached to that other component.

The system also includes a list of parameters that contain numerical data from component nodes. Parameter (data) nodes include the following: sensed parameters, i.e. parameters that store data from a sensor; un-sensed parameters, i.e. parameters that are not sensed but are used to store a desired value; modelled parameters, i.e. parameters that store data produced by a model; and alarm parameters, i.e. parameters that are used to store an alarm flag. Hence, the relational model may optionally include sensed parameter nodes; un-sensed parameter nodes; modelled parameter nodes, and alarm parameter nodes. It is envisaged that other parameters will be needed, depending on the application.

To connect the nodes, links are provided. There are several types of links, often providing a many to many relationship. Link types include component to component; component to parameter, and parameter to parameter. Several distinct component to component links are defined, for example a component to power supply component. This could more properly be called "sink to source component" as it is a domain-independent link. This links any type of component, including a power supply component, to a power supply component. For instance, a 5V power supply may be connected to a 12V battery supply. This is a component to power supply component link. Another component to component link is the sub-component to component link. This indicates that the sub-component may only be diagnosed using component-specific information attached to the component. Yet another defined link is the sensor component to sensed component. This is useful, because some systemic sensor components may directly sense the state of another component. For instance, a temperature sensor may be connected to a power supply, which connection would be represented using this type of link.

Figure 10:
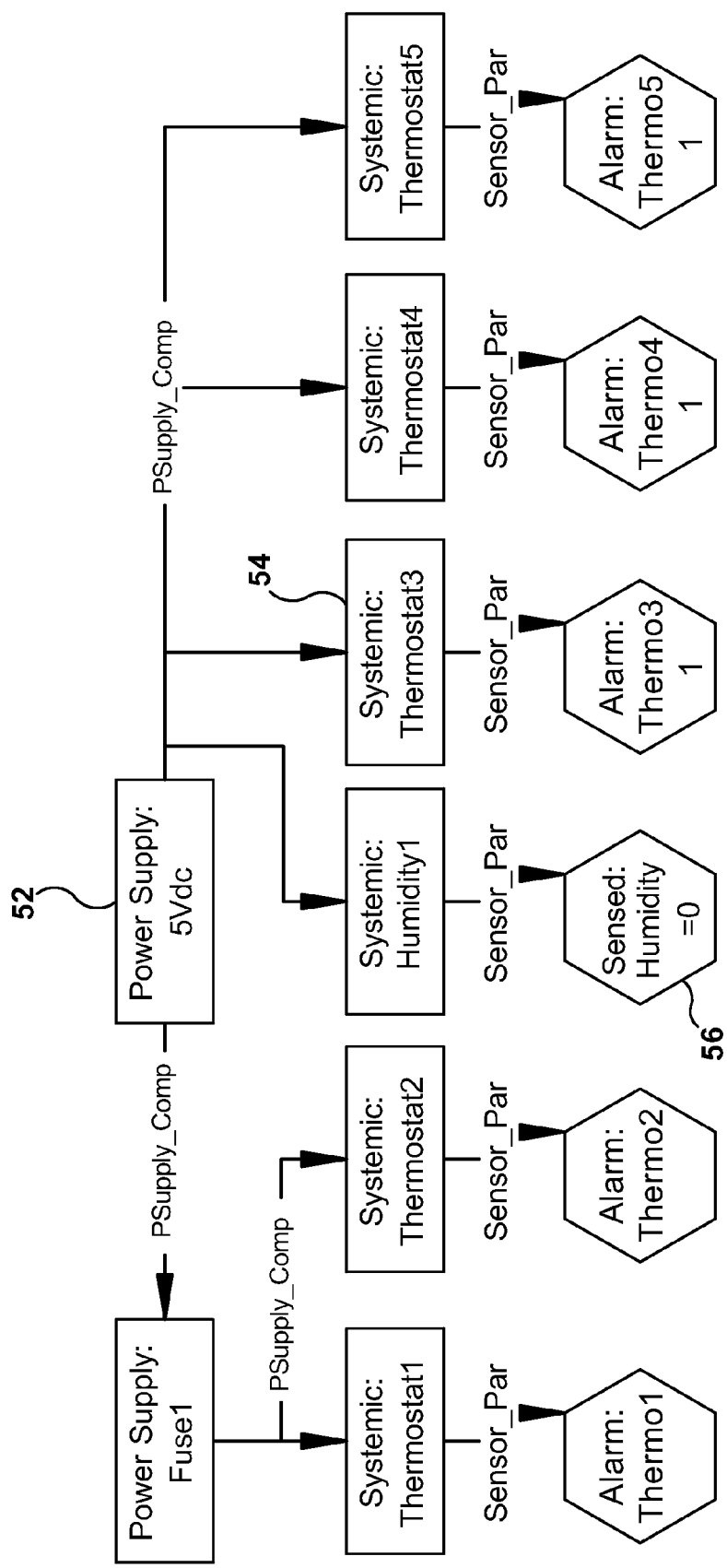
FIG. 10 is an example of a topological map for a target system, showing various different components, parameters and associated links.

Component to parameter links include a sensor component to sensed parameter link. This shows which parameter stores the data gathered from a particular sensor. Also defined is an un-sensed parameter to component link. This is useful because some parameters are not sensed but instead hold desired values, such as desired thrust. This link shows which component the desired value is related to, such as desired thrust linked to an open-loop thruster controller. Parameter to parameter links include a modelled parameter to sensed parameter link. This shows that the modelled parameter is intended to reflect the state of the sensed parameter, for instance modelled vehicle roll to sensed vehicle roll. Another example of this type of link is a sensor to equivalent sensor link. This can be used to show that two sensors can be considered equivalent, or overlapping, such as a magnetic compass and a gyro-compass. Examples of each of these component and parameter types and the various different links are shown in FIG. 10.

Associated with each link of the topology module are attributes. Links may have two attributes, although this could be extended as and when desired. The first attribute is the endpoint 1. This is a unique identifier of the node at one end of the link. The other attribute is the endpoint 2. This is a unique identifier of the node at the other end of the link. Attributes are also stored in connection with each node of the topological map. These define certain physical and/or historical characteristics. The first of these attributes is the type of node, which is typically an enumerated value representative of the node type. For example, in the map of FIG. 10 the source component 52 is marked "power supply:5V dc". For parameter nodes, sensor data and their automatically generated differential are also stored. For example, in FIG. 10, the parameter node 56 associated with the first humidity sensor, "Humidity1" 54, includes the data "humidity=0". Also stored as an attribute is the activity status of the component. Typically, this is a flag that is generated using component-specific activity information showing whether the component is active at this moment in time.

Another node attribute that is stored is a fault status indicator, which is provided to give an indication of whether a component has been diagnosed as faulty. As well as this there is a suspicion index, which is a value that reflects the nominations a component has received from the various diagnostic tools. This is updated according to the outputs from the different diagnostic tools via a fusion scheme module. In general, this will not be an integer value. Another useful node attribute is the delta index, which was mentioned earlier in connection with the correlator. This is a value that represents the way the data has changed over time. Each of the fault status indicator and the suspicion index is stored in the relevant component node, with the delta index typically being stored in the relevant parameter node.

Once the topological map of the system is created, heterogeneous data relating to the system components is used to create the structured knowledge database. As noted before and as shown in FIG. 8(b), within this database, each component has a heterogeneous knowledge store associated with it. As mentioned previously, the knowledge database includes fixed design data such as MTBF etc. Additionally, however, it includes static rules: a full set of logical statements; dynamic rules: a full set of logical statements plus time dependency (i.e. if this happened between 10 and 15 seconds ago), and equational models: models with different numbers of variables, of varying orders. There is no need to fuse the different types of knowledge, but they should be stored in standardised formats. The data, rules and/or models stored in the knowledge database can be used by one or more of the diagnostic tools in order to detect and/or diagnose faults. To this end, the control software in the control module 10 is configured to pass the relevant type of knowledge to different diagnostic tools as and when desired.

Figure 11:
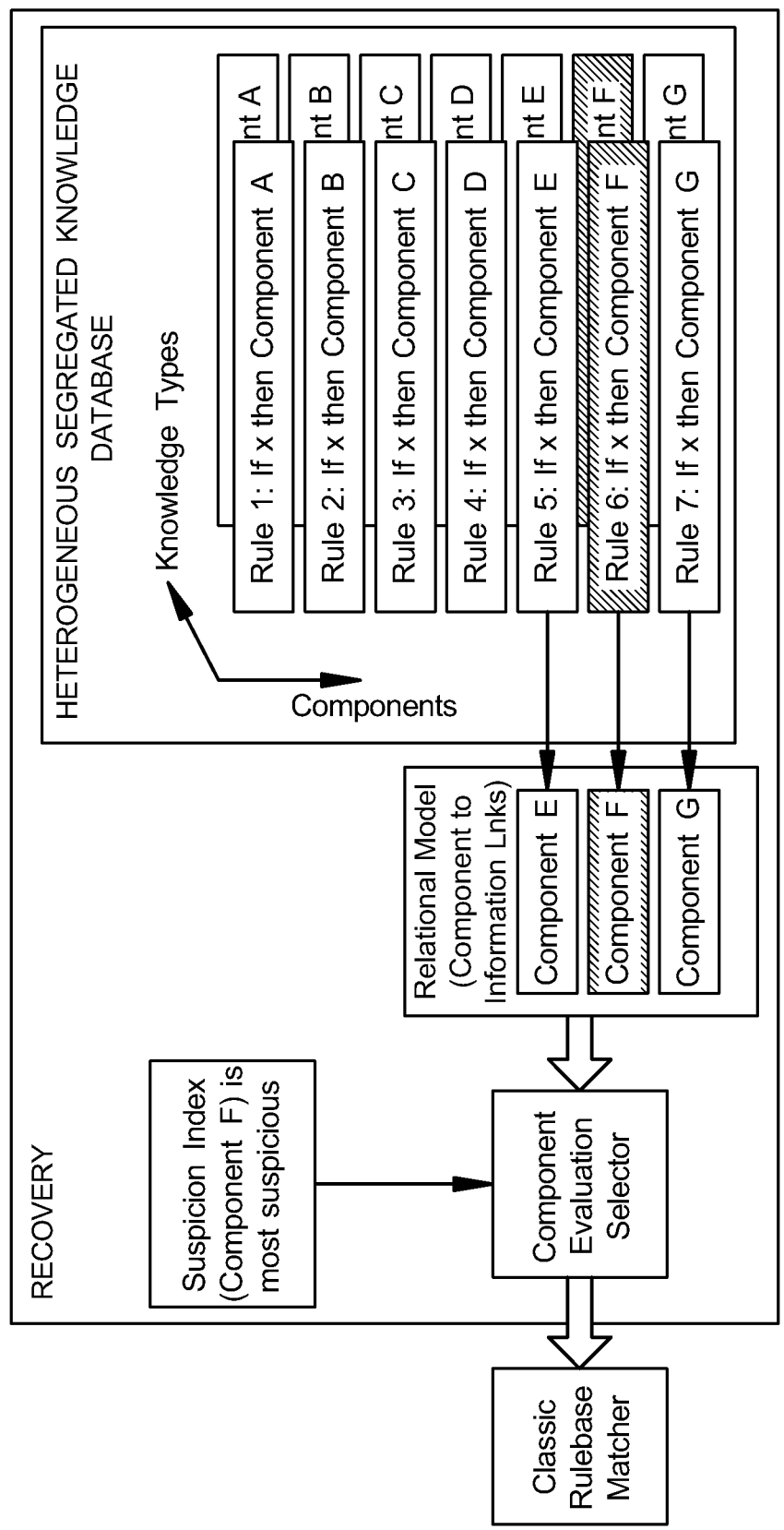
FIG. 11 is a diagrammatic representation showing how a knowledge database that includes information on a target system is matched to a topological map of that system.

FIG. 11 illustrates an example of the segregated knowledge database, which includes a plurality of different knowledge types for each component. In this particular example, a rule is provided for each component in the system, which if satisfied means that the component is faulty. Each rule is linked to the relevant node in the relational model. In the event that a component is identified as being faulty, such as component F in FIG. 11, its suspicion index is incremented in the relational model.

Figure 12:
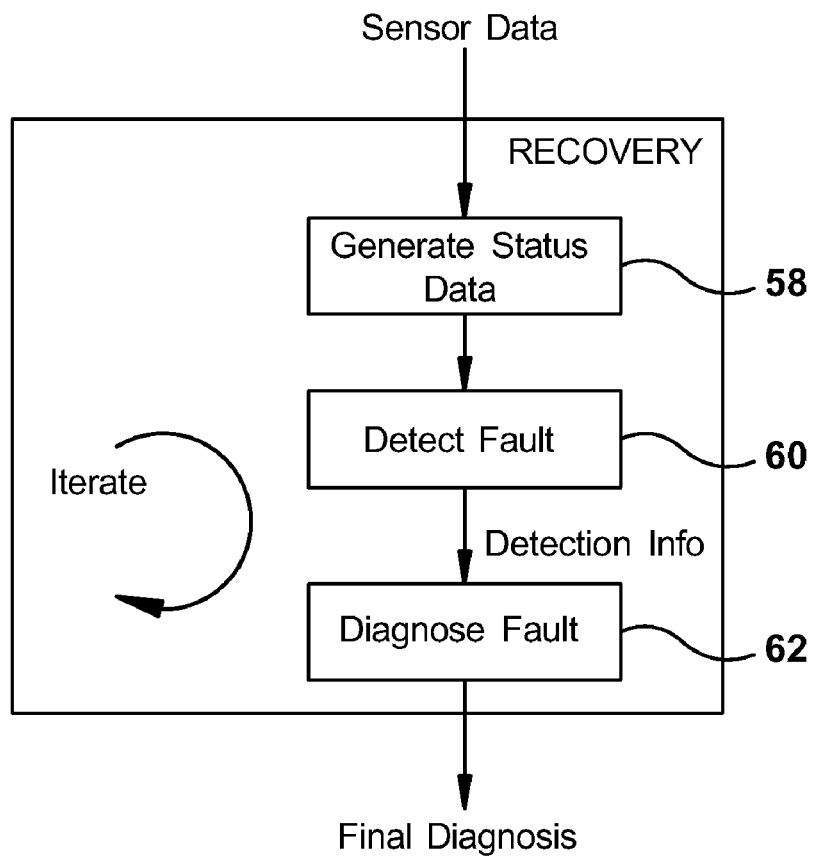
FIG. 12 is a flow diagram of the steps that are taken in operation of a diagnosis system as shown in FIG. 5.
Figure 13:
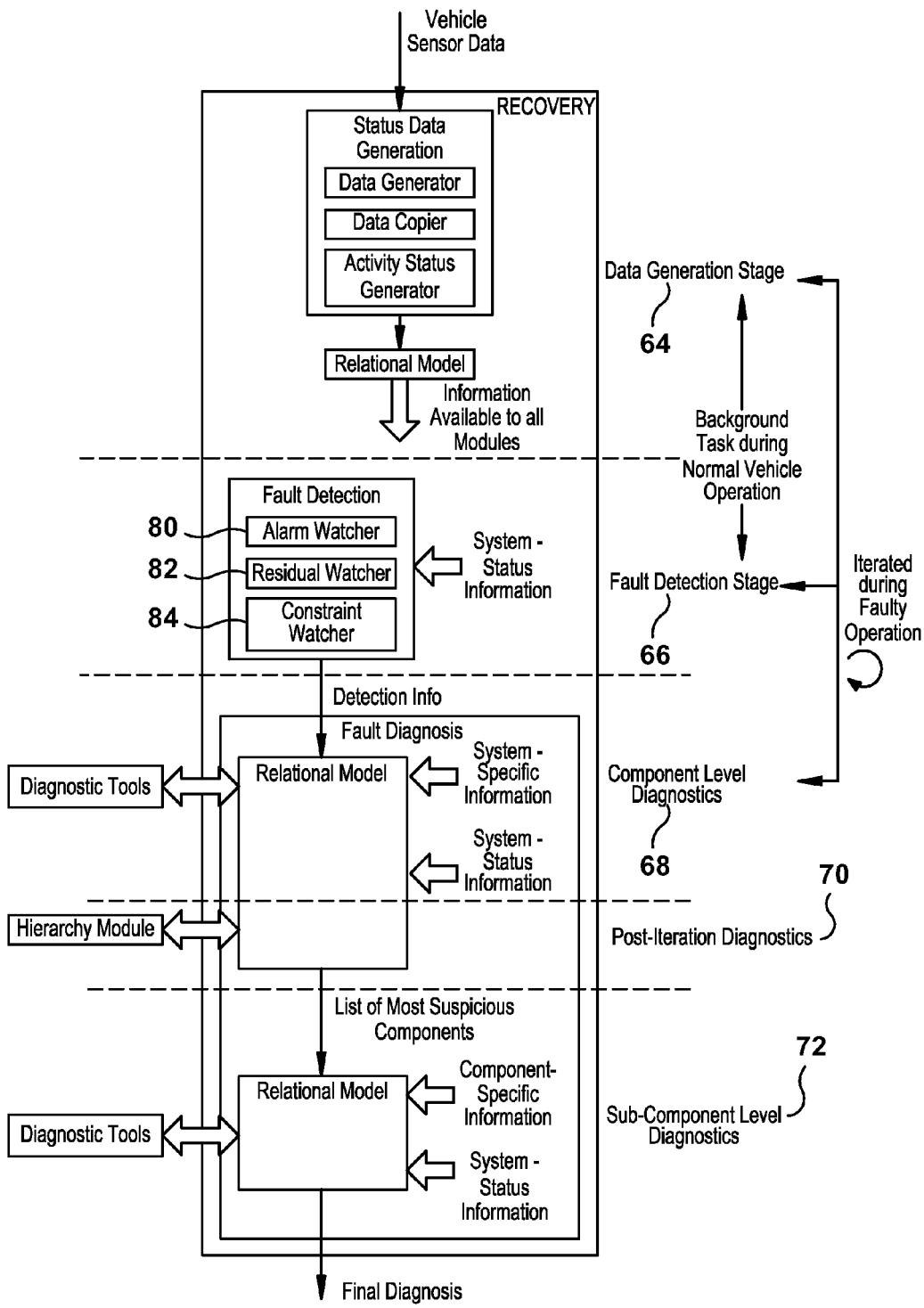
FIG. 13 is a flow diagram of the steps taken when sensor data is received from a target system.

Once the system is initialised, it can be invoked every time the target system has a complete set of new sensor data, although it could be invoked every time any new sensor data is available. FIG. 12 shows the basic steps in the process that is started when sensor data 58 is received. The sensor data is firstly used to generate status data that is indicative of the current status of the system. This current status data is then used to detect 60 and, if possible, diagnose 62 any faults. At a more detailed level, and as shown in FIG. 13, the process involves generating data 64; entering a fault detection mode 66; diagnosing faults at a component level 68; doing post-iteration diagnostics 70 and then doing sub-component level diagnostics 72.

The first stage of the process is information generation. This is done in two parts: data copying, and data generation. For data copying, it is assumed that the system has access to target system sensor data. In general the diagnostics system in which the invention is embodied is kept at arms length from the target system in order to keep portability, although as will be appreciated, this is not essential. Assuming that the diagnostics system is remote from the target system, the first step of invocation is to copy target system data into the diagnostic system. All of this sensor data is entered into and stored in parameter nodes within the relational model. This input data can be used to generate extra information using system design information in the knowledge database that is attached to the relational model. This generated data may include modelled parameters; activity status and tool information. In any case, all of this generated data is entered into and stored in parameter nodes within the relational model.

In order to determine modelled parameters, system-specific models can be used to calculate what the system should be doing. To do this they must generally be provided with certain system parameters, from which they will calculate various sensor readings. These modelled sensor values have their own parameter node in the relational model, with a 'modelled parameter to sensed parameter' link to relate it to the sensed data value. A system in which modelled parameters can be used is shown in FIG. 14(a), and an example of the corresponding modelled nodes are shown in the topological map of FIG. 14(b). As a specific example, consider the sub-system 73. In this case, the current sensed by sensor 74 is added to the parameter node 76. Associated with the parameter node 76 is a modelled parameter node 78 that includes data that is indicative of a modelled or expected value for the sensor data. In the event that there is a discrepancy between these two values, this may indicate that the component is faulty.

As regards the activity status, the knowledge of whether a component is 'active' at a particular time is extremely useful for diagnostics. Some components can be considered active all the time, others only in certain situations. For instance, a thruster could be considered active only when turning. But a conventional motor in, say, a paper mill, will be active whenever it is producing torque (for which it does not have to be turning).

The last of the generated data for this example is tool information, which is generated by the diagnostic tools. This information can be time consuming to produce in one go, so it can be better to generate it incrementally during each invocation. For example, consider the correlator, which is used to generate information indicative of the way parameters are changing. One approach is to leave the correlator dormant until a fault has been detected, then run through the entire temporal log file to generate information on how the parameter has changed. This minimises normal operation computing requirements, but maximises them during diagnosis when they are most needed. A better approach may be to generate parameter change information each time the diagnostic system is invoked. Each calculation is tiny and so unlikely to add much to the computational burden during normal operation. It is only when they must be calculated thousands of times in one block that they significantly affect computational burden.

As mentioned before, the correlator uses a delta index. This is a simple way of providing tool information representing the way a parameter has changed over time. The delta index is a number that starts at zero. The next time a parameter is updated the delta index is changed as follows: if the parameter has increased, the delta index is incremented by 1; if the parameter has decreased, the delta index is decreased by 1; if the parameter has not changed, the delta index is not changed. Care must be taken the first time a parameter is updated as there will be no previous value to compare it to. In this case the delta index should be kept at zero.

Each time data is received and information generated, a time stamped record of this is stored in the temporal log. The information in the temporal log is primarily for use by the correlator. Once the information generation stage is completed, the relational model contains as much useful information/data as possible. Indeed, it is a full state representation of the target system. Hence, the fault detection stage can be entered.

The fault detection stage is carried out by various fault detection modules. Modules that check for faults shall be referred to as watchers. Any suitable current detection techniques can be used by the watchers, including those based on residual generation and constraint violation. Three watchers are proposed, these being a residual watcher 82; a constraint watcher 84 and an alarm watcher 80.

Figure 15:
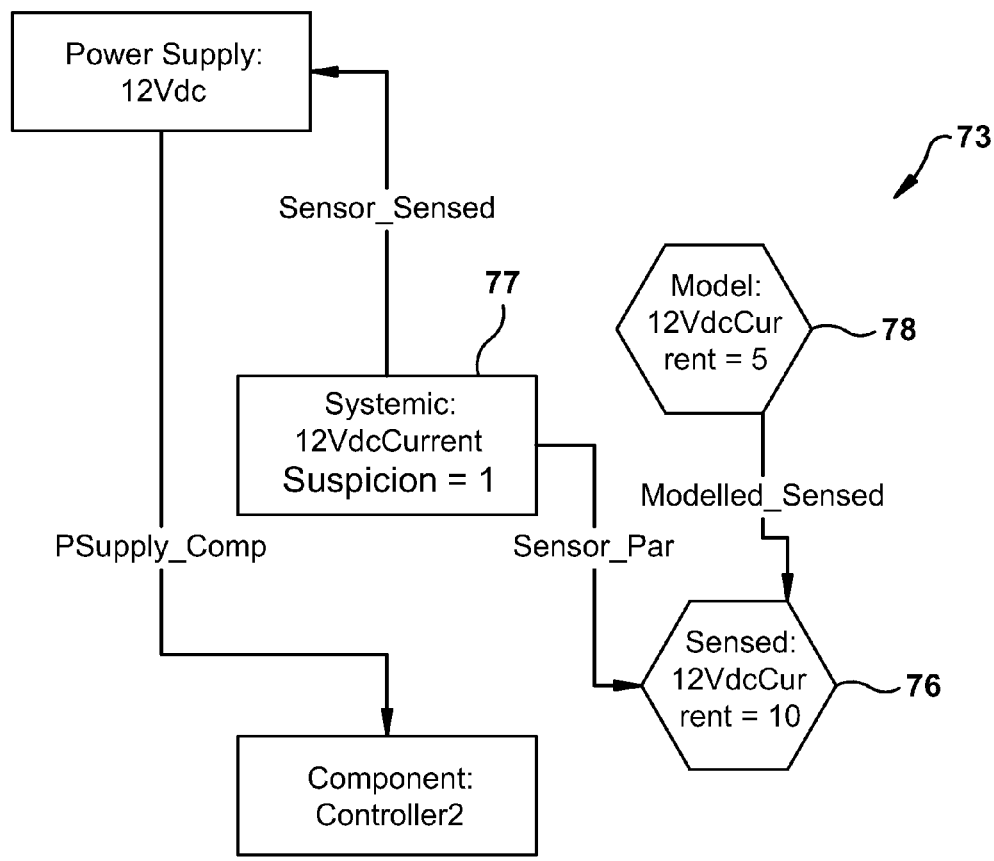
FIG. 15 is an example of a portion of the topological map of FIG. 14(*b*), in which a component is nominated as being suspicious, because there is a discrepancy between a sensed and a modelled parameter.

The residual watcher is operable to monitor the difference between sensed (observed) and modelled data. For instance, if the sensed roll of a vehicle is 20 degrees, and the modelled is 25 degrees, there is a residual of 5 degrees. Residuals indicate whether the system is behaving in an unexpected manner. This is, of course, assuming that the system models are correct. The residual watcher 82 simply checks all the links between sensed and modelled parameters in the relational model. It checks the data stored at each end and looks for a residual. If there is a residual then the sensor that senses that parameter is automatically nominated as suspicious and the component's suspicion index is incremented by 1. FIG. 15 shows a map in which this is illustrated. In this case, the modelled parameter in the parameter node 78 for the 12V dc supply is "5". In contrast, from the sensed parameter node 76 it can be seen that the sensed current is "10". This discrepancy is detected by the residual watcher 82 and a suspicion index in the component node 77 associated with the component is set to "Suspicion=1".

The constraint violation watcher 84 is operable to monitor certain sensor data and detect when a pre-determined limit is reached. Constraints can be system specific, such as roll may not exceed +−45 degrees, because otherwise all the oil runs out and the engine seizes. Additionally or alternatively, constraints may be task specific, such as a particular goal needing roll to be less than +−5 degrees, because a sensor needed for that task must be straight and level to work properly. System specific constraints are part of the design information, and as such should be integrated into the knowledge database at compile time. Task specific constraints are likely to be part of the enveloping target system, so the task specific constraint watcher will probably run outside the system, providing information when relevant.

Figure 16:
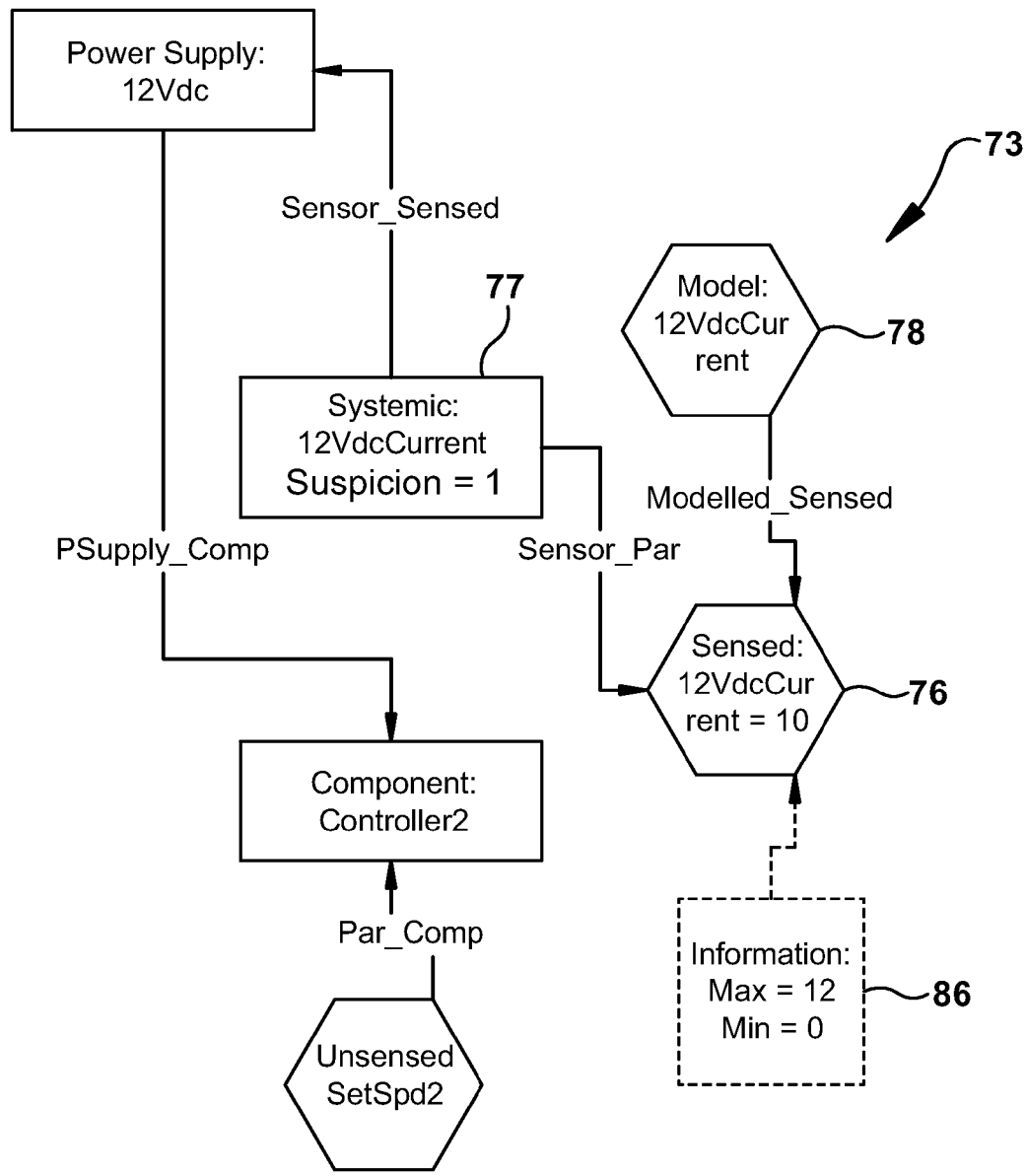
FIG. 16 is an example of a portion of the topological map of FIG. 14(*b*), in which a component is nominated as being suspicious, because the sensed data exceeds a pre-determined threshold.

Component specific constraints are also be included. An example of component specific data that could be used by the constraint watcher is shown in FIG. 16. In this case, associated with the component node 77 for the 12V dc current is a constraint that the maximum current is 12, and the minimum current is 0. This information is derived from the knowledge database, a representative portion 86 of which is shown in FIG. 16. In this example, the parameter node 76 shows that the sensed current is 16, which means that the maximum value is exceeded. The constraint watcher 84 is operable to detect this, and when it does causes the suspicion index in the component's node 77 to be incremented to "Suspicion=1", which indicates that there may be a problem with this component.

Figure 17:
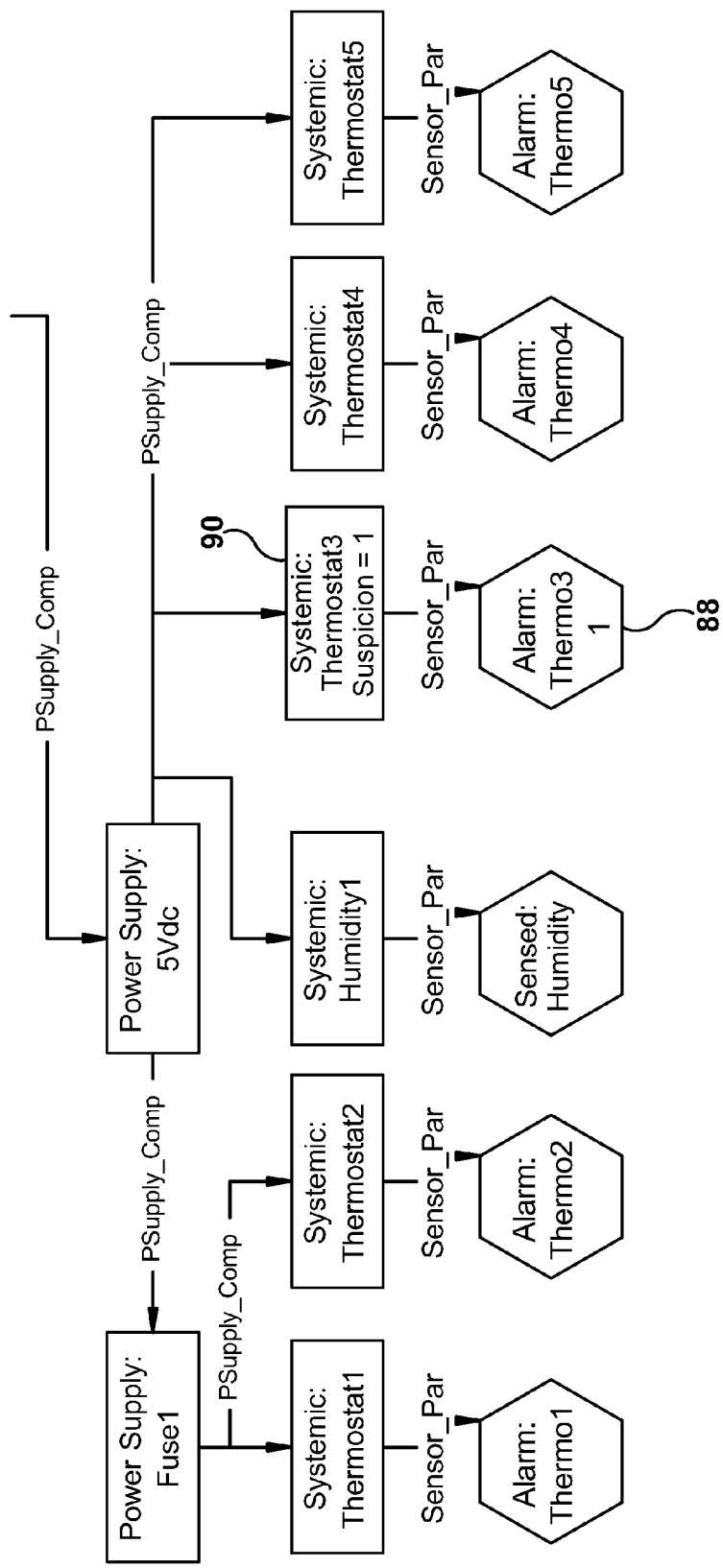
FIG. 17 is portion of the topological map of FIG. 14(*b*), in which a component is nominated as being suspicious, because an alarm indicator is active.
Figure 18:
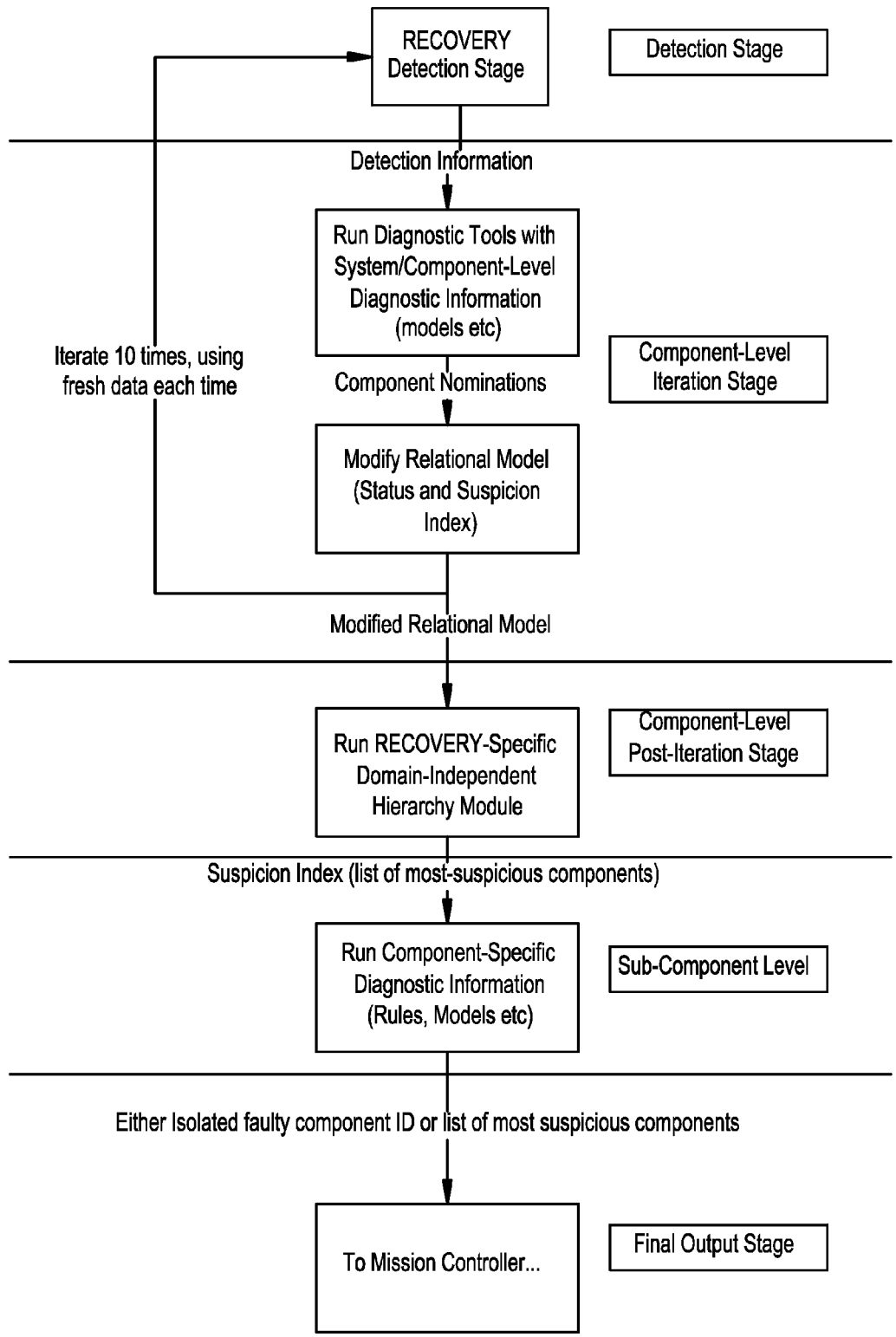
FIG. 18 is a flow diagram of the overall detection and diagnosis process.

The alarm watcher 80 is operable to scan all alarm parameter nodes to see if they have become active. FIG. 17 shows an example, in which an alarm parameter node 88 for the third thermostat has become active. When this is detected by the alarm watcher, the watcher causes the suspicion index in the node 90 associated with the thermostat to be incremented to "Suspicion=1". This alerts the relational model to the fact that there is a potential problem with this component.

If no faults are found by the various watchers then all the data in the relational model is stored for use in future diagnosis. The system then lies dormant until a fresh set of sensor data is available from the target system, at which point the 'normal operation' cycle is repeated. In the event that suspicious components are nominated, the diagnosis routine is entered. Before this, however, the location of where the faults were detected, i.e. the name of the parameter node, is stored.

Diagnosis is done in two stages, system level and component level. System level diagnosis focuses in on suspicious components, that is components that have a suspicion index of greater than 1, so that their specific, detailed information may be analysed. This saves time compared to running through the entire set of diagnostic information stored in the structured database. There are two stages to system level diagnostics, these being a first iterative stage and a second post-iterative stage.

Essentially, the system level iterative operation involves running plugged-in diagnostic tools, such as bayesian belief networks, vibrational analysers and model-based diagnostics. These are run in isolation, with their outputs, i.e. nominated components, being combined in the relational model using the suspicion index. Once this is done, the correlator is run. After this, the post iterative operation is carried out. Typically, the post iteration level is run once, after the final iteration is completed, in order to look at the complete set of information produced during the iterative phase. This consists of running tools that 'take a step back' and look at the complete set of information, including the way that components have been nominated by diagnostic tools over time. This stage currently consists of the topological analysis module, which looks for common connections between nominated components, such as a power supply. Current operation uses ten iterations, which encompasses ten sensor updates over approximately two seconds. Systems with long time constants, such as chemical plants, will probably need different numbers of iterations, or the same iterations over a longer time.

Figure 14:
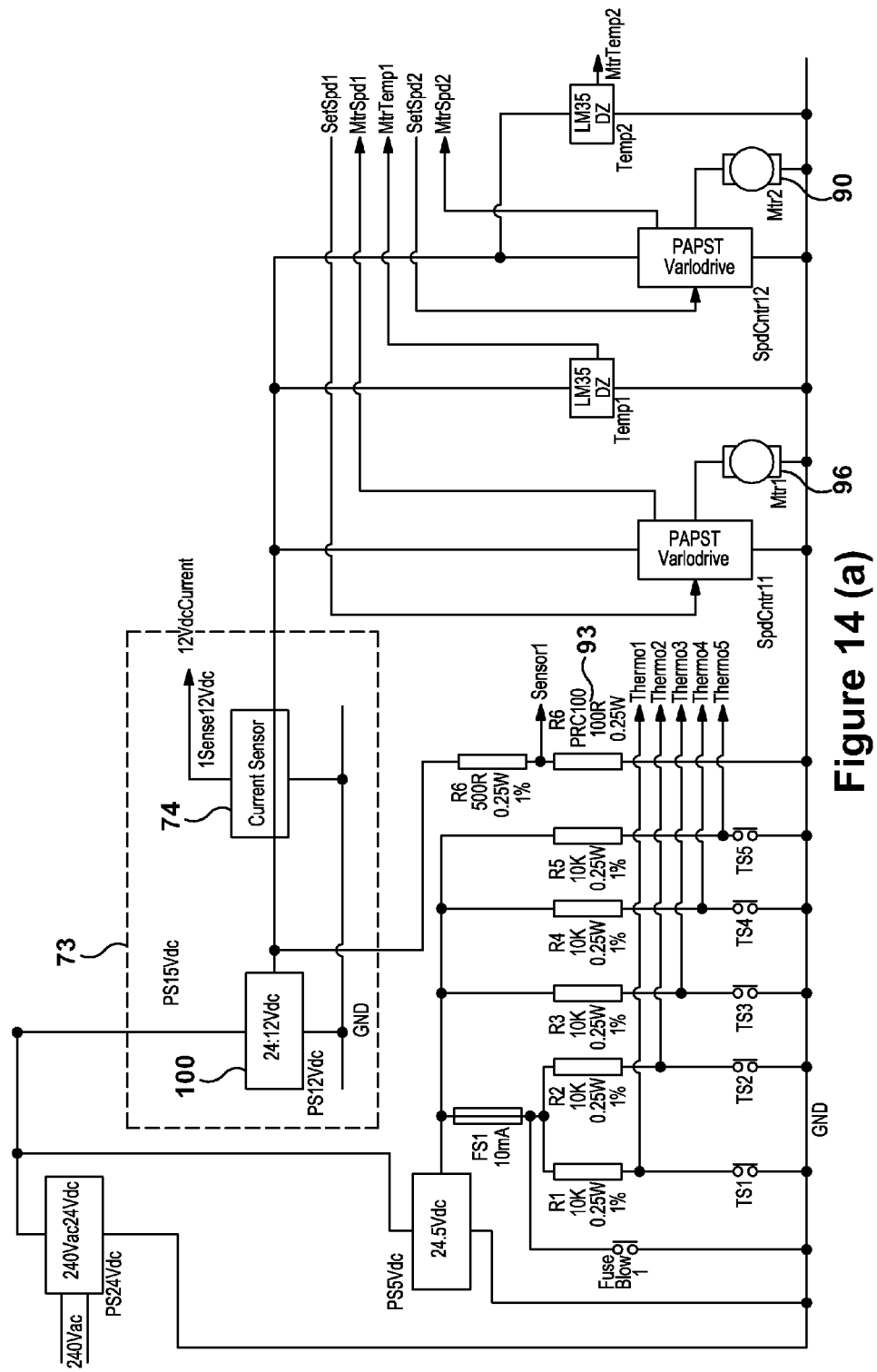
FIG. 14(*a*) is a block diagram of an example target system, and FIG. 14(*b*) is the topological map for that system, in which modelled parameter nodes are shown.
Figure 14:
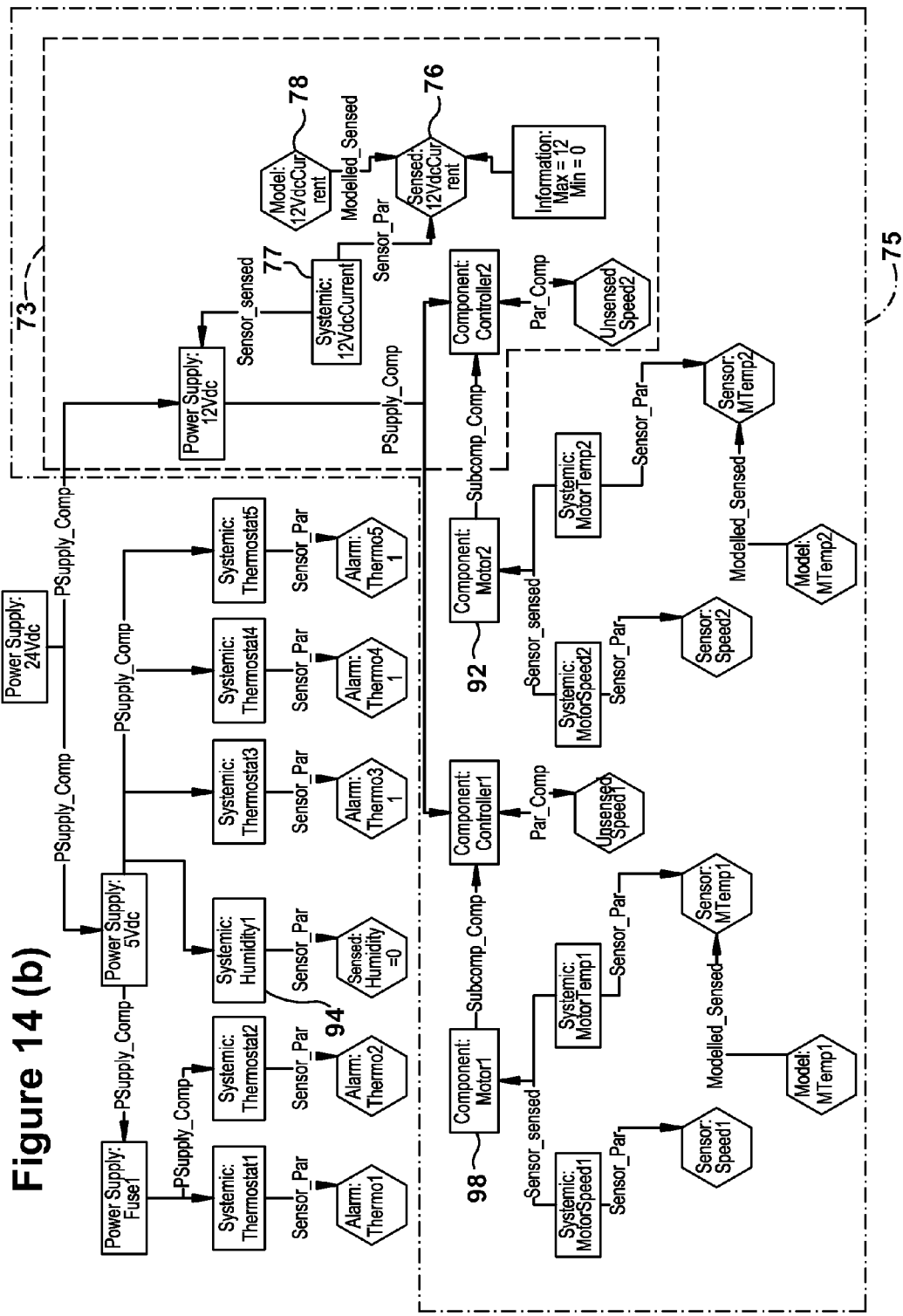

As a specific example, consider a portion 75 of the target system of FIG. 14(*a*) and the corresponding topological map of FIG. 14(*b*). This includes a power supply that is connected to two motors, i.e. motor1 and motor2, see FIG. 14(*a*). Connected to the power supply is a sensor for measuring the current drawn. Associated with each motor are sensors from determining the motor speed and temperature. In the relational model domain shown in FIG. 14(*b*), the power supply and its current sensor are represented by a power supply component node, a sensor node, a sensed parameter node 76 and a modelled parameter node 78. In the part of the knowledge database associated with the power supply are maximum and minimum values for the sensed current. Each motor and its sensors are represented in the relational model by a component/motor node, a sensor node for the speed sensor and an associated sensed parameter node, and a sensor node for the temperature sensor that is linked to a sensed temperature parameter node and a modelled temperature parameter node.

For the purposes of example, it is assumed that the fault in this circuit is that Motor2 90 has jammed. In practice, this would cause a near-instantaneous increase in the amount of electrical power drawn from the 12Vdc power supply 100. This increase in power would cause the motor to get hot, although this would take some time. The increase in power drawn would cause a residual between the modelled and sensed 12VdcCurrent parameters, as can be seen from the nodes 76 and 78 shown on the right hand side of FIG. 14(*b*). In the detection phase, this would be detected by the residual watcher, and a faulty parameter would be noted. This is the first indication that there may be a fault. At this early stage, it is assumed that the temperature of motor2 has not increased by enough to be detected by its temperature sensor.

Once the detection phase is completed, the diagnosis stage is entered, and an appropriate diagnostic tool is applied. As an example, a model-based diagnosis tool could be used. Of course, this would have been registered during initialisation. Provided in the knowledge database and for use with the model based tool would be a model of the faulty parameter. This is passed to the model-based diagnosis tool for use thereby. In this way, only the relevant model is run, i.e. that associated with the power supply, so saving time and power. It should be noted that in this example, because there are two motors that are connected to the power supply, the model-based diagnosis engine would not be capable of determining which motor is at fault, although this is not always the case. It can only determine that either motor is capable of causing too much current to be drawn. Because of this each motor is nominated, and the suspicion index for each is increased by 1. However, because the conditions of the target system change with time, it may yet be possible to focus in on which motor is causing the problem. For example, by the time of the next iteration, it may be that the jammed motor, i.e. motor2, will have started to overheat, with the temperature exceeding that predicted by its associated model. This means that there would be a discrepancy between the values in the sensed and modelled parameter nodes associated with the temperature sensor for motor2. When the detection phase is entered, this discrepancy would be detected by the residual detector, which would mean that there are now two residuals generating faults, one of which results in both motors being nominated as faulty, and the other of which nominates only the second motor 2. This means that motor1 has one nomination and motor2 has two. Hence, motor2 now has the highest score, and is correctly identified as being faulty. In this way, by fusing (or combining) the outputs of different, isolated diagnostic tools the overall diagnostic capability has been improved.

As another example, consider the use of the correlator module. The sensor 93 of FIG. 14(*a*), which corresponds to component node Systemic:Humidity1 94 of FIG. 14(*b*), is located in close physical proximity to motor2. This is common in man-made systems where space is constrained, leading to unpredicted (and unpredictable) coupling across systems. As motor2 heats up it also heats the humidity sensor 93. Such sensors are often susceptible to extreme temperature changes, and so the reading of sensor 93 will change slightly with temperature. In this case the reading drifts higher as the temperature increases, until eventually the sensor reading is beyond its constraint. This is detected by the constraint watcher 84, which automatically nominates the humidity sensor 93. This causes the suspicion index in the corresponding sensor node 94 to be incremented by 1. The correlator is now invoked to look for parameters that track faulty parameters. It finds that the humidity reading has been increasing recently, and so has the temperature of motor2. This is a suspicious coincidence, and so it nominates the motor2. This causes the suspicion index in the corresponding motor node 92 to be incremented by 1. In this way, the correlator has found a link between an apparently faulty parameter and an actually faulty (motor) component. This physical/thermal link was not modelled in the relational model, nor was the fault predicted. The faulty motor 90 has been nominated as faulty without any specific knowledge referring to it. Hence, by using the correlator a totally unforeseen fault has been diagnosed.

As an example of how the recently used indicator function of the correlator can diagnose faults, again with reference to the system of FIG. 14(*a*), consider the situation where no fault was detected until motor1 was activated, blowing an internal fuse when it started up. Once the fault has been detected, i.e. the blown internal fuse, the correlator looks through the temporal log (cumulatively generated during the information generation stage) to see if any components have been activated shortly before the fault. It finds that motor1 was activated just before the fault was detected, and so it nominates it as suspicious. This causes the suspicion index in the corresponding node 98 to be incremented by 1.

As an example of how the topology module works consider the situation where the 5Vdc power supply of FIG. 14(*a*) has failed due to a faulty internal component. This supply is connected to a plurality of thermostats 3, 4, 5 and a humidity sensor. The thermostats are provided for measuring the temperatures of some other components that are not relevant to the fault associated with the power supply. Typically, the thermostats provide a 'high' signal when the components whose temperatures they are measuring are acceptable. This is usually referred to as being the inactive state. If the component's temperatures go outside acceptable levels then the thermostats provide a 'low' signal. This is generally referred to as the active state.

In the event that the 5Vdc power rail of FIG. 14(*a*) drops instantly to zero, power is removed from all attached components and so they all power down. The humidity sensor's output drops to zero, but typically this would be within an acceptable parameter range and so it would not appear to be faulty. The loss of the 5Vdc power supply means that the thermostats are no longer able to provide the 'high' signal. They can only supply the 'low' signal, even though the temperatures they are measuring are acceptable. This would cause the thermostats 3, 4 and 5 to appear active, indicating that the components whose temperatures they are sensing are higher than acceptable. This is a false alarm. As the thermostats 3, 4 and 5 are responsible for sensing a fault they are automatically nominated. Hence in the detection phase, the suspicion index for each of these would be increased by one.

Once the diagnosis stage is entered, the topology analyser is designed to look for common connections between apparently faulty components. In the present example, the topology analyser would find that the 'faulty' thermostats 3, 4 and 5 are all supplied by the 5Vdc power supply. The apparently operational humidity sensor is also supplied by that supply, and it seems to be working. However, because most of the components supplied by the 5Vdc power supply are possibly faulty, the 5Vdc supply is also nominated as possibly faulty as it is the common connection Hence the suspicion index for the power supply is increased by one. It should be noted that the topology analyser does not exonerate the apparently faulty components, in this case thermostats 3, 4, 5, of suspicion because it could be that all three thermostats have failed, or the three components they are sensing really have become too hot.

There can be common connections between common connections, and these must be searched for too. For example, in FIG. 14(*a*) if the 5Vdc supply is nominated as faulty, but the 12Vdc power supply is not then there is no reason to nominate the 24Vdc supply to which both the 5Vdc supply and the 12Vdc supply are connected. However, if there were problems showing up with the 12Vdc power supply then the 24Vdc supply would certainly be nominated, as both active components connected to it would be showing faults. But there is no common connection between them, and so there are no grounds for nominating the 24Vdc supply. It should be noted that the 24Vdc supply could have failed, but without other components that are directly connected to it being nominated (such as the 12Vdc power supply), the evidence is not strong enough.

At the end of the post-iteration stage as much information as possible has been gleaned using 'broad brush' techniques. A short list of suspicious components has been generated. This is now used to focus the search for the fault. Each component has self-specific design and diagnostic information attached to it. There can be a lot of this information, which is why the system-level diagnostics is run first to focus the search down to a few components. Their attached information can then be run in detail, rather than running through every component's information in detail. For example, a common type of component-specific design information is Mean Time Between Failure, usually abbreviated to MTBF. This is the amount of time that this type of component can usually last before failing. In FIGS. 15 and 16 the Sensor: 12VdcCurrent component has been nominated as faulty, and so has made it into the list of components to have their attached information analysed. The MTBF analyser has retrieved the component's MTBF and compared it to the amount of time that the component has been active for over the life of the system. The time is greater than the MTBF, and so this component receives another nomination, pushing its ranking up the list of suspicious components. Other types of component specific information will also be analysed at this time.

At the end of the component-specific level all relevant information will have been analysed, and a list of suspicious components produced. Each component will have a ranking, derived from the number and type of nominations received during detection and diagnosis. The component with the highest ranking is the one most likely to be at fault. At this stage, now that diagnosis is complete, the information is passed to the target system's command and control system. This decides how the system should cope with the fault. Coping is usually done in one of two ways, degrading or aborting. To degrade the operation is preferable, as the system can still operate and achieve most of its goals. Aborting is usually the least preferable option as it means totally stopping system operation, although if this means saving the system from destruction then it may be preferred. If the system operation is degraded then this information must be fed back to the diagnostic system so that it can correctly detect and diagnose future faults. Examples include setting components as faulty so that time is not wasted analysing their information, and adjusting models so that they reflect the new system operation.

The system in which the invention is embodied may be implemented in several ways. For example, it could be used as a telemetry watcher to determine the health of a remote system by monitoring a telemetry stream. Alternatively, it could be used as an embedded watcher, which is located on a target system. In this case, it would be configured to determine the system's health and either report health status, or provide diagnosis directly to the target system to allow it to adapt its behaviour. As yet a further example, the system could be used as an offline watcher. In this case, the system could be located anywhere, and configured to read in a log file to determine health status during the past operation of a system (for instance, the system could be run on the black box data recovered from a crashed aeroplane).

The system in which the invention is embodied provides many advantages. It uses design information about the target system; represents the state of the target system as completely as possible; stores the target system's design information, and offers a common ground for different types of diagnostic systems, thereby to allow them to work together. By mapping the real physical system topology and filling parameter nodes with data, the state of the target system can be simply and effectively represented. By using models and other methods it is possible to generate states that are not directly sensed, for instance modelling remaining battery capacity without actually sensing it, thereby increasing the diagnostic capabilities of the system.

A skilled person will appreciate that variations of the disclosed ideas are possible without departing from the invention. For example, whilst the topological map and the knowledge database are conceptually distinct, in practice the relevant information in each of these is likely to be stored in the same general area of memory, not in two separated, but linked memory areas. Accordingly, the description of a specific embodiment is made by way of example only and not for the purposes of limitation. It will be clear to the skilled person that minor modifications may be made without significant changes to the operation.

The invention claimed is:

1. A diagnostics system comprising:
   a topological map of a target system that has nodes that correspond to components of the target system and links that correspond to connections between the components;
   a knowledge store that has a structure that reflects or corresponds to that of the topological map, the store having a plurality of sections or libraries each of which is provided for storing data associated with one of the nodes defined in the topological map;
   means for receiving data from one or more sensors on the target system;
   means for including either the received data in the topological map and/or data that is a function of that received data, and
   means for diagnosing faults using the data in the topological map and the knowledge store.

2. A system as claimed in claim 1 comprising means for generating data using the received sensor data and adding that generated data to the topological map, preferably wherein the generated data is modelled data and/or activity status data that is indicative of whether a component is active and/or time derivative or dependent data that is indicative of any change in the data as a function of time.

3. A system as claimed in claim 1 wherein one or more parameter nodes are provided in association with each component node for storing the received data and/or the generated data.

4. A system as claimed in claim 1 wherein the means for diagnosing comprise a plurality of diagnostic tools, preferably one or more domain independent diagnostic tools.

5. A system as claimed in claim 4 wherein the domain independent diagnostic tool includes a correlator for nominating a component as being faulty on the basis of a correlation of behaviour of two or more components as a function of time.

6. A system as claimed in claim 5, wherein the correlator is operable identify parameters that track faulty parameters and/or components that become active just before the occurrence of a fault and/or components that are being used at the time of occurrence a fault.

7. A system as claimed in claim 2 including a topology analyser that is operable to identify components that are connected to apparently faulty components and nominate one or more commonly connected components as being faulty.

8. A system as claimed in claim 7, wherein the topology analyser is configured to nominate a commonly connected component as being faulty if more than a pre-determined number of active components connected to the commonly connected component appear faulty.

9. A system as claimed in claim 1 wherein the means for detecting faults comprise a residual watcher that is operable to nominate a component as being faulty in the event that a sensed parameter is different from a modelled parameter and/or a constraint watcher that is operable to nominate a component as being faulty in the event that a sensed parameter exceeds a pre-determined threshold or is outside a pre-determined range and/or an alarm watcher that is operable to nominate a component in the event that an alarm signal is received.

10. A system as claimed in claim 1 wherein for every component identified as being potentially faulty there is included in the topological map a measure of a level of suspicion for that component, preferably wherein the measure of the level of suspicion is stored in the node for that component.

11. A system as claimed in claim 10 wherein the measure of suspicion is monitored using a suspicion index that is changed each time the component is nominated as faulty.

12. A system as claimed in claim 11 wherein the suspicion index is a pre-set integer, such as 0, for a component that has not been nominated and is incremented by 1 each time the component is nominated.

13. A system as claimed in claim 1 comprising means for generating an ordered list of suspicious components, preferably with the most suspicious component presented first.

14. A method for diagnosing faults involving:
   storing a topological map of a target system that has nodes that correspond to components of the target system and links that correspond to connections between the components;
   storing a knowledge store that has a structure that reflects or corresponds to that of the topological map, the store having a plurality of sections or libraries each of which is provided for storing data, preferably component specific design data, associated with one of the nodes defined in the topological map;
   receiving data from one or more sensors on the target system;
   including the received data in the topological map, and/or data that is a function of that received data, and
   diagnosing faults using the data in the topological map and the knowledge store.

15. A computer program, preferably on a data carrier or a non-transitory computer readable medium, for diagnosing faults in a target system, the computer program having code or instructions for: receiving data from one or more sensors on the target system; including the received data in a topological map of the target system, the map having nodes that correspond to components of the target system and links that correspond to connections between the components and diagnosing faults using the data in the topological map and a knowledge store, the knowledge store having a structure that reflects or corresponds to that of the topological map, the store having a plurality of sections or libraries each of which is provided for storing data, preferably component specific design data, associated with one of the nodes defined in the topological map.

\* \* \* \* \*